(12) United States Patent
Kim et al.

(10) Patent No.: US 8,150,409 B2
(45) Date of Patent: Apr. 3, 2012

(54) METHOD OF CONTROLLING DATA TRANSMISSION IN A WIRELESS RELAY SYSTEM, AND THE RELAY SYSTEM IMPLEMENTING THE METHOD

(75) Inventors: Young-Doo Kim, Yongin-si (KR); Eung Sun Kim, Yongin-si (KR); Chang Wook Ahn, Yongin-si (KR); Seung Hoon Nam, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1225 days.

(21) Appl. No.: 11/638,575

(22) Filed: Dec. 14, 2006

(65) Prior Publication Data

US 2008/0045212 A1    Feb. 21, 2008

(30) Foreign Application Priority Data

Aug. 21, 2006  (KR) .................. 10-2006-0078940

(51) Int. Cl.
*H04W 72/00*    (2009.01)
*H04B 3/36*    (2006.01)
*H04B 7/14*    (2006.01)
*H04J 1/10*    (2006.01)
*H04J 3/08*    (2006.01)
*H04L 12/28*    (2006.01)

(52) U.S. Cl. ......... 455/452.2; 455/7; 455/450; 370/315; 370/351

(58) Field of Classification Search ...... 455/7, 450–454; 370/315, 351–356, 389–390
See application file for complete search history.

(56) References Cited

U.S. PATENT DOCUMENTS 5,197,095 A * 3/1993 Bonnet et al. ............ 379/106.07
2002/0187746 A1   12/2002 Cheng et al.
(Continued)

FOREIGN PATENT DOCUMENTS

EP    1 357 713 A1    10/2003
JP    2003-009236 A    1/2003
JP    2004-363645 A    12/2004
(Continued)

OTHER PUBLICATIONS

Throughput Optimal Control of Cooperative Relay Networks MSRI Workshop Apr. 10, 2006 Edmund M. Yeh Dept of Electrical Engineering Joint work with Randall Berry, Northwestern University.*

(Continued)

*Primary Examiner* — Erika Gary
*Assistant Examiner* — Michael Mapa
(74) *Attorney, Agent, or Firm* — Sughrue Mion, PLLC

(57) ABSTRACT

A data transmission method in a wireless relay system, and a method of selecting an optimal transmission mode based on a channel capacity of an individual link that is measured by a mobile station. The data transmission method includes: transmitting a first ratio of first partial data of the data from a base station to a mobile station; transmitting a second ratio of second partial data of the data from the base station to a first relay station; and forwarding the second partial data from the first relay station to the mobile station, wherein the first ratio or the second ratio is determined based on any one of a channel capacity of a first link between the base station and the mobile station, and a channel capacity of a second link between the first relay station and the mobile station.

36 Claims, 14 Drawing Sheets

U.S. PATENT DOCUMENTS

| | | | |
|---|---|---|---|
| 2003/0018447 A1* | 1/2003 | Florschuetz | 702/124 |
| 2004/0114639 A1* | 6/2004 | Oldenborgh et al. | 370/537 |
| 2005/0014464 A1* | 1/2005 | Larsson | 455/11.1 |
| 2005/0243757 A1* | 11/2005 | Yagyu et al. | 370/328 |
| 2007/0076649 A1* | 4/2007 | Lin et al. | 370/328 |
| 2007/0177545 A1* | 8/2007 | Natarajan et al. | 370/331 |
| 2008/0045212 A1* | 2/2008 | Kim et al. | 455/435.1 |

FOREIGN PATENT DOCUMENTS

| | | |
|---|---|---|
| KR | 10-2006-0035358 A | 4/2006 |
| KR | 10-2006-0041978 A | 5/2006 |
| KR | 10-2006-0058852 A | 6/2006 |
| WO | WO 2005/067173 A1 | 7/2005 |

OTHER PUBLICATIONS

NPL Cooperative Diversity Cooperative Diversity in Wireless Networks: Efficient Protocols and Outage Behavior IEEE Transactions on Information Theory, vol. 50. No. 12 Dec. 2004 J. Nicholas Laneman, Memeber, IEEE, David N.C. Tse, Member, IEEE, Gregory W. Wornell, Fellow, IEEE.*

Nabar et al., "Fading Relay Channels: Performance Limits and Space-Time Signal Design," IEEE J. Selected Areas in Communications, Aug. 4, 2004, pp. 1099-1109, vol. 22, No. 6.

Laneman et al., "Cooperative Diversity in Wireless Networks: Efficient Protocols and Outage Behavior," IEEE Transactions on Information Theory, Dec. 2004, pp. 3062-3080, vol. 50, No. 12.

Deng et al., "Power Allocation for Cooperative Relaying in Wireless Networks," IEEE Communications Letters, Nov. 2005, pp. 994-996, vol. 9, No. 11.

Larsson et al., "Collaborative Transmit Diversity with Adaptive Radio Resource and Power Allocation," Jun. 2005, pp. 511-513, vol. 9, No. 6.

* cited by examiner

FIG. 4

| TRANSMISSION MODE | ESTIMATED TRANSMISSION TIME | MODE SELECTION STANDARD |
|---|---|---|
| DIRECT TRANSMISSION MODE | $T_1 = B/C_{bm}$ | $T_{overall} = \min\{T_1, T_2, T_3\}$ |
| DIVERSITY MODE | $T_2 = B/C_{br} + B/C_{div}$ | |
| SPATIAL MULTIPLEXING MODE | $T_3 = B \dfrac{C_{sm2}}{C_{sm1} + C_{sm2}} \left( \dfrac{1}{C_{br}} + \dfrac{1}{C_{sm2}} \right)$ | |

METHOD OF CONTROLLING DATA TRANSMISSION IN A WIRELESS RELAY SYSTEM, AND THE RELAY SYSTEM IMPLEMENTING THE METHOD

CROSS-REFERENCE TO RELATED APPLICATION

This application claims priority from Korean Patent Application No. 10-2006-0078940, filed on Aug. 21, 2006, in the Korean Intellectual Property Office, the entire disclosure of which is incorporated herein by reference.

BACKGROUND OF THE INVENTION

1. Field of The Invention

Apparatuses and methods consistent with the present invention relate to a data transmission in a wireless relay system. More particularly, the present invention relates to a method of selecting an optimal transmission mode based on a channel capacity of an individual link that is measured by a mobile station.

2. Description of Related Art

Multiple In Multiple Out (MIMO) technology is currently being discussed in association with improving a performance of a mobile communication system. The MIMO technology designates a technology which installs a plurality of antennas in each of a base station (BS) and a mobile station (MS), and increases a high speed data service coverage area with high throughput around the BS.

In a MIMO system, a data transmission rate (hereinafter, data rate) increases in proportion to a minimum value of a number of transceiving antennas. However, since a plurality of antennas cannot be installed in the MS due to a spatial restriction, there are some constraints to acquire an overall high multiplexing gain.

Accordingly, a wireless relay technology which can reduce a transmission loss and improve a multiplexing gain by directly transmitting data to an MS and also transmitting the data via at least one relay station (RS), is required.

FIG. 1 is a diagram illustrating a configuration of a wireless relay system according to a conventional art. Referring to FIG. 1, the wireless relay system includes a BS 10, at least one RS 20, and an MS 30. Here, the BS 10 provides a wireless communication area to an individual cell 100. The RS 20 intermediates data to be transmitted/received between the BS 10 and the MS 30. Also, the MS 30 wirelessly transmits/receives the data with the BS 10.

As shown in FIG. 1, in the wireless relay system, when transmitting data from the BS 10 to the MS 30, the data may be directly transmitted via a BS-MS link 12. Also, at the same time, the data may be transmitted via a BS-RS link 11 and an RS-MS link 21. As described above, in the wireless relay system, a multiplexing gain may be acquired by installing the RS 20 in a particular location of the cell 100 and increasing a number of data transmission paths between the BS 10 and the MS 30.

FIG. 2 illustrates operations based on two types of protocols associated with data transmission in a wireless relay system, according to the conventional art. Here, the protocols have been discussed in a number of papers including Nabar and Bölcskei, "Space-time signal design for fading relay channels" (2003); Nabar, Bölcskei, and Kneubuhler, "Fading relay channel: performance limits and space-time signal design" (2004); Hasna and Alouini, "Optimal power allocation for relayed transmissions over Rayleigh-fading channels" (2004); Laneman, Tse, and Wornell, "Cooperative diversity in wireless networks" (2004), Deng and Haimovich, "Power allocation for cooperative relaying in wireless networks" (2005); Larsson and Cao, "Collaborative transmit diversity with adaptive radio resource and power allocation" (2005); and the like.

According to a protocol (protocol 1) 210, the BS 10 simultaneously transmits data to the RS 20 and MS 30 in a first time slot 211. Thus, the MS 30 receives the data from the BS 10 in the first time slot 211. The RS 20 forwards the data received from the BS 10 to the MS 30 in a second time slot 212.

Conversely, according to another protocol (protocol 2) 220, the BS 10 transmits data to only the RS 20 in a first time slot 221, and transmits the data to only the MS 30 in a second time slot 222. The RS 20 forwards the data, received from the BS 10, to the MS 30 in the second time slot 222. Thus, the MS 30 simultaneously receives the data from the BS 10 and the RS 20 in the second time slot 222.

As described above, in the wireless relay system according to the protocol 210, since the MS 30 receives the data a number of different times, the protocol 210 may be regarded as a Single Input Multiple Output (SIMO) method. Conversely, in the wireless relay system according to the protocol 220, since the MS 30 simultaneously receives data from a plurality of channels, the protocol 220 may be regarded as a Multiple Input Single Output (MISO) method.

Conventionally, a method of acquiring a diversity gain based on the protocol 210 is utilized due to easy analysis. Such is the case in the above-mentioned papers. Here, in the protocol 210, algorithms are developed in a form of the SIMO method. Thus, to increase throughput, i.e. a cell capacity based on the protocol 210, only a limited method, such as a power control method or a path selection method, may be utilized.

Also, some studies, which are based on the protocol 220 and usually focus only on how to increase a diversity gain, do not address a way to improve throughput.

Accordingly, an aspect of the present invention suggests a wireless relay technology which can outperform the above-described conventional art and also can increase a cell capacity and expand a cell radius based on the protocol 220.

SUMMARY OF THE INVENTION

An aspect of the present invention provides a wireless relay system which can adaptively change a data transmission mode depending upon a location of an MS and an RS in a cell.

An aspect of the present invention also provides a wireless relay system which can select any one transmission mode from a direct transmission mode, a diversity transmission mode, and a spatial multiplexing mode based on a channel capacity of each wireless link, and transmit information about the selected transmission mode to a BS and an RS to thereby transmit data according to the selected transmission mode. Here, the channel capacity is measured by an MS.

An aspect of the present invention also provides a new data transmission method which can acquire a multiplexing gain by transmitting total data at different ratios via a direct transmission path from a BS to an MS and an indirect path using an RS.

It is also an aspect of the present invention to increase a cell capacity of a mobile communication system by improving throughput of a downlink data transmission from a BS to an MS when a cell radius is fixed.

It is also an aspect of the present invention to reduce an initial installation cost of a mobile communication system and effectively plan a cell having a cell capacity by expanding the radius of a cell that supports an identical cell capacity.

According to an aspect of the present invention, there is provided a method of transmitting data, the method including: transmitting a first ratio of first partial data of the data from a BS to an MS; transmitting a second ratio of second partial data of the data from the BS to a first RS; and forwarding the second partial data from the first RS to the MS, wherein the first ratio or the second ratio is determined based on any one of a channel capacity of a first link between the BS and the MS, and a channel capacity of a second link between the first RS and the MS.

According to another aspect of the present invention, there is provided a method of transmitting data, the method including: directly transmitting first partial data from a BS to an MS; and transmitting second partial data from the BS to the MS via at least one RS, wherein the first partial data and the second partial data are contained in a total of the data transmitted from the BS and are different from each other.

According to still another aspect of the present invention, there is provided a method of controlling a data transmission, the method including: estimating channels of a plurality of wireless links that respectively connect a BS, an RS, and an MS to each other; selecting any one of a plurality of transmission modes by the MS, based on a channel estimation value; and transmitting information about the selected transmission mode to the BS and the RS, wherein the plurality of transmission modes includes at least one of: a direct transmission mode which directly transmits total data from the BS to the MS; a diversity mode which directly transmits the total data from the BS to the MS, and transmits the total data from the BS to the MS via the RS; and a spatial multiplexing mode which directly transmits a certain portion of the total data from the BS to the MS, and transmits remaining data from the BS to the MS via the RS, and the BS and the RS transmit the data according to the selected transmission mode.

According to yet another aspect of the present invention, there is provided a wireless relay system including a BS, an RS, and an MS in each of cells, wherein: the BS directly transmits first partial data of total data to the MS, and transmits second partial data of the total data to the MS via the RS, and the MS simultaneously receives the first partial data from the BS and the second partial data from the RS.

According to still another aspect of the present invention, there is provided a wireless relay system including a BS, at least one RS, and an MS in each of a plurality of cells, wherein: the MS measures a channel capacity of a plurality of wireless links that respectively connect the BS, the RS, and the MS to each other, and selects any one of a plurality of transmission modes, based on the measured channel capacity, and the BS and the RS transmit data to the MS according to the selected transmission mode, and the plurality of transmission modes includes at least one of: a direct transmission mode which directly transmits total data from the BS to the MS; a diversity mode which directly transmits the total data from the BS to the MS, and transmits the total data from the BS to the MS via the at least one RS; and a spatial multiplexing mode which directly transmits a certain portion of the total data from the BS to the MS, and transmits remaining data from the BS to the MS via the at least one RS.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 4 is a table showing an estimated transmission time for each transmission mode of FIG. 3, and a mode selection standard based on the estimated transmission time;

DETAILED DESCRIPTION OF EXEMPLARY EMBODIMENTS OF THE INVENTION

Figure 1:
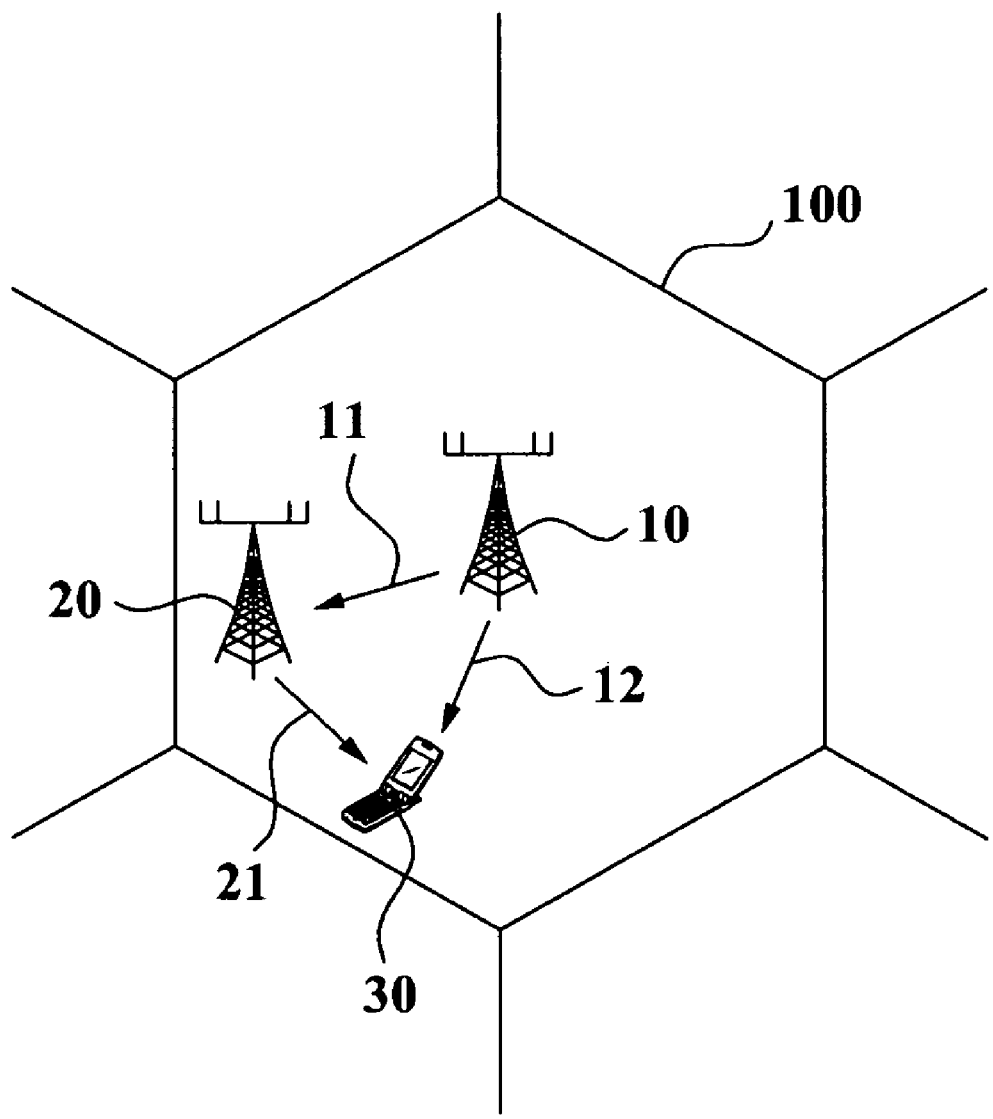
FIG. 1 is a diagram illustrating a wireless relay system according to a conventional art.
Figure 2:
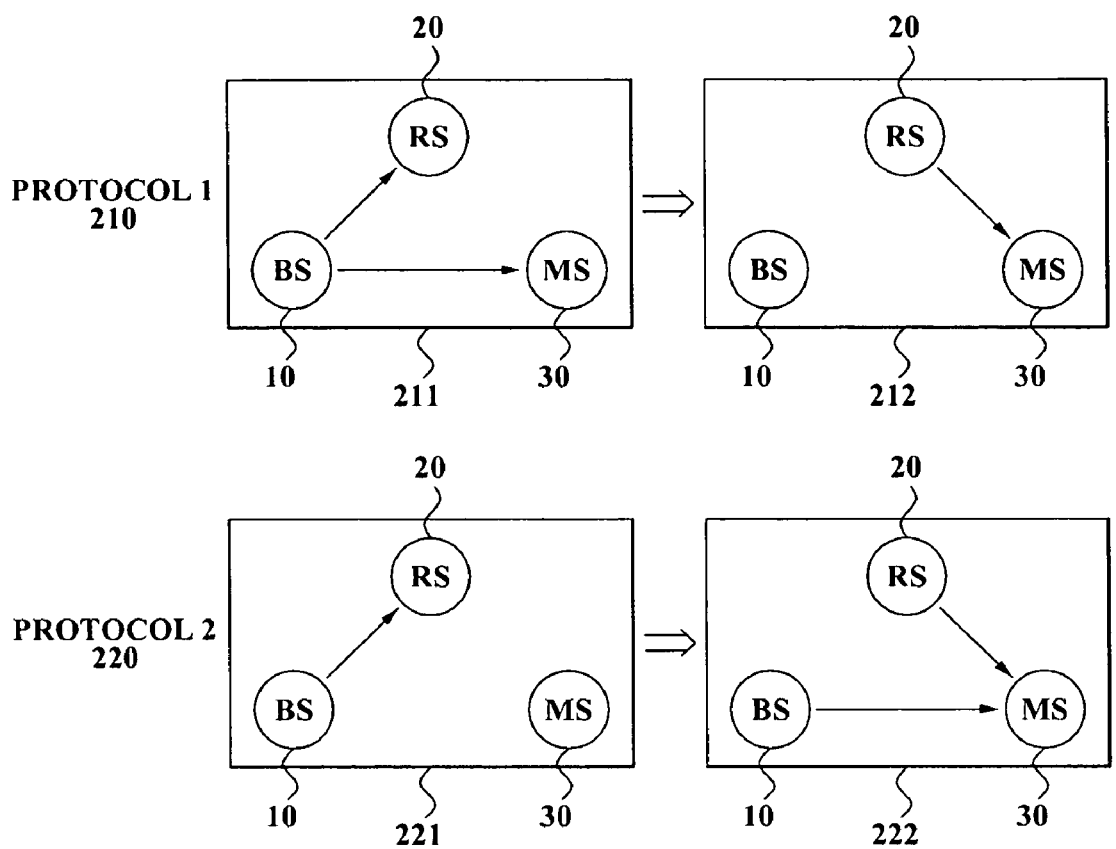
FIG. 2 illustrates operations based on two types of protocols associated with a data transmission in a wireless relay system, according to the conventional art.

Reference will now be made in detail to exemplary embodiments of the present invention, examples of which are illustrated in the accompanying drawings, wherein like reference numerals refer to the like elements throughout.

Figure 3:
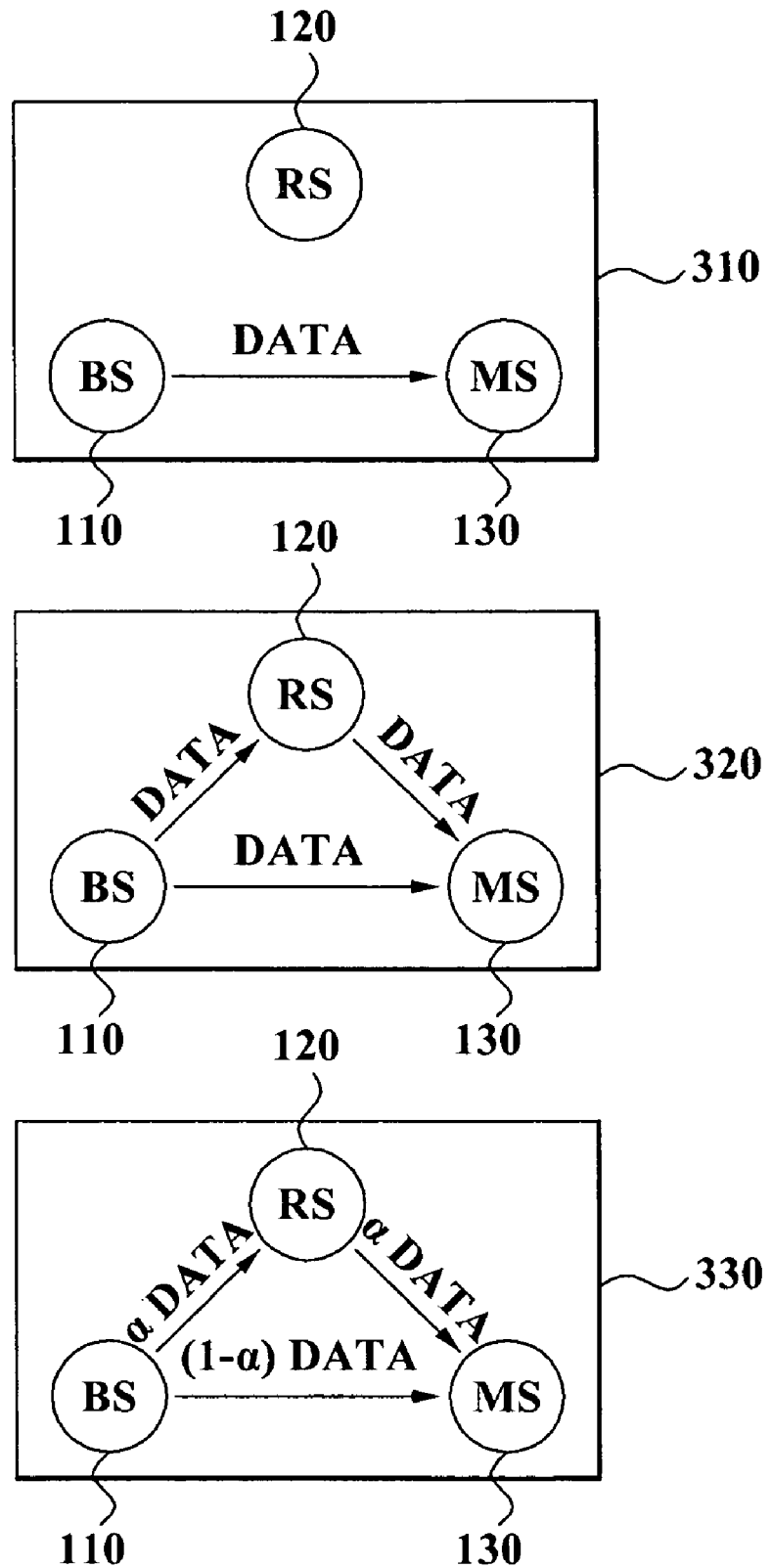
FIG. 3 illustrates operations of three transmission modes supported by a method of controlling a data transmission according to an exemplary embodiment of the present invention.

FIG. 3 illustrates operations of three transmission modes supported by a method of controlling a data transmission according to an exemplary embodiment of the present invention.

A first transmission mode illustrated in FIG. 3 indicates a direct transmission mode 310 where total data is directly transmitted from a base station (BS) 110 to a mobile station (MS) 130 while not passing through a relay station (RS) 120.

A second transmission mode illustrated in FIG. 3 indicates a diversity mode 320 where total data is directly transmitted from the BS 110 to the MS 130 and, at the same time, the identical total data is transmitted from the BS to the MS 130 via the RS 120.

In a spatial multiplexing mode 330, a certain ratio $\alpha$ of total data is transmitted via the RS 120. A remaining ratio, 1-$\alpha$, of the total data is directly transmitted from the BS 110 to the MS 130. Thus, a multiplexing gain may be acquired.

More specifically, the diversity mode 320 and the spatial multiplexing mode 330 pass through two data transmission operations. In a first operation, the BS 110 transmits total data or partial data to the RS 120. In a second operation, the RS 120 forwards the received total data or the partial data to the MS 130. Also, in the second operation, the BS 110 transmits total data or remaining data to the MS 130. Thus, the MS 130 may simultaneously receive the identical total data or different partial data from the BS 110 and the RS 120 in the second operation.

A selection of a transmission mode, as described above, is based on a channel capacity for each wireless link. Here, the channel capacity is measured by the MS 130. When a total of B bits of data are transmitted from the BS 110 to the MS 130, a spectral efficiency of a wireless relay system is defined by $\beta=B/T$. Here, T designates a time that is spent to transmit the B bits of data.

When a channel value of each link is given, the channel capacity may be calculated. Also, an estimated transmission time for each link may be calculated by using a calculated channel capacity value for the spectral efficiency. In the diversity mode 320 and the spatial multiplexing mode 330 where data is transmitted via a plurality of links according to a transmission path, the estimated transmission time to transmit total data in a corresponding transmission mode may be calculated by a summation of all the estimated transmission times that are calculated for each of the plurality of links.

An optimal transmission mode corresponds to a transmission mode which has a minimum estimated transmission time to transmit total data. When the estimated transmission time with respect to each of the direct transmission mode 310, the diversity mode 320, and the spatial multiplexing mode 330 is $T_1$, $T_2$, and $T_3$, respectively, estimated transmission time $T_{overall}$ in the optimal transmission mode is represented as $\min\{T_1, T_2, T_3\}$.

FIG. 4 is a table arranging an estimated transmission time for each transmission mode calculated by the above described method. Referring to FIG. 4, since total data is transmitted by using only a BS-MS link in the direct transmission mode 310, estimated transmission time $T_1$ is determined based on open-loop capacity $C_{bm}$ from the BS 120 to the MS 130. The determined estimated transmission time $T_1$ is represented as $$T_1 = B/C_{bm} \quad \text{[Equation 1]}$$

However, estimated transmission time $T_2$ in the diversity mode 320 is determined based on closed loop capacity $C_{br}$ of a BS-RS link which corresponds to a data transmission path in the first operation/time slot, and diversity capacity $C_{div}$ which is a channel capacity when the MS 130 simultaneously receives data from the BS 110 and the RS 120 in the second operation/time slot. Specifically, the estimated transmission time of an overall system is determined by adding the estimated transmission time in the first operation and the estimated transmission time in the second operation. The determined estimated transmission time $T_2$ is represented as $$T_2 = B/C_{br} + B/C_{div} \quad \text{[Equation 2]}$$

Also, estimated transmission time $T_3$ in the spatial multiplexing mode 330 is determined based on the closed loop capacity $C_{br}$ of the BS-RS link in the first operation, and open-loop capacity $C_{sm1}$ of the BS-MS link and open-loop capacity $C_{sm2}$ of the RS-MS link in the second operation.

In the spatial multiplexing mode 330, the ratio $\alpha$ of data is transmitted via the BS-RS link. Also, the remaining ratio, $1-\alpha$, of data is transmitted via the BS-MS link. Thus, the estimated transmission time from the BS 110 to the RS 120 is $\alpha B/C_{br}$. Also, the estimated transmission time from the BS 110 to the MS 130 and the estimated transmission time from the RS 120 to the MS 130 are defined as $(1-\alpha)B/C_{sm1}$ and $\alpha B/C_{sm2}$, respectively. Here, since the two estimated transmission times must be identical, $\alpha=C_{sm2}/(C_{sm1}+C_{sm2})$. Thus, the estimated transmission time $T_3$ in the spatial multiplexing mode 330 is determined as $$T_3 = \frac{\alpha B}{C_{br}} + \frac{(1-\alpha)B}{C_{sm1}} \quad \text{[Equation 3]}$$
$$= B \frac{C_{sm2}}{C_{sm1}+C_{sm2}} \left( \frac{1}{C_{br}} + \frac{1}{C_{sm2}} \right)$$

The BS 130 selects the transmission mode that has a minimum estimated transmission time among the calculated estimated transmission times $T_1$, $T_2$, and $T_3$, as the optimal transmission mode. The BS 110 and the RS 120 receive information about the selected transmission mode from the MS 130, and transmit data according to the selected optimal transmission mode.

A method of controlling a data transmission in a wireless relay system according to the present exemplary embodiment has been briefly described. A method of controlling a data transmission according to other exemplary embodiments of the present invention will be described in detail with reference to FIGS. 5 through 7.

Figure 5:
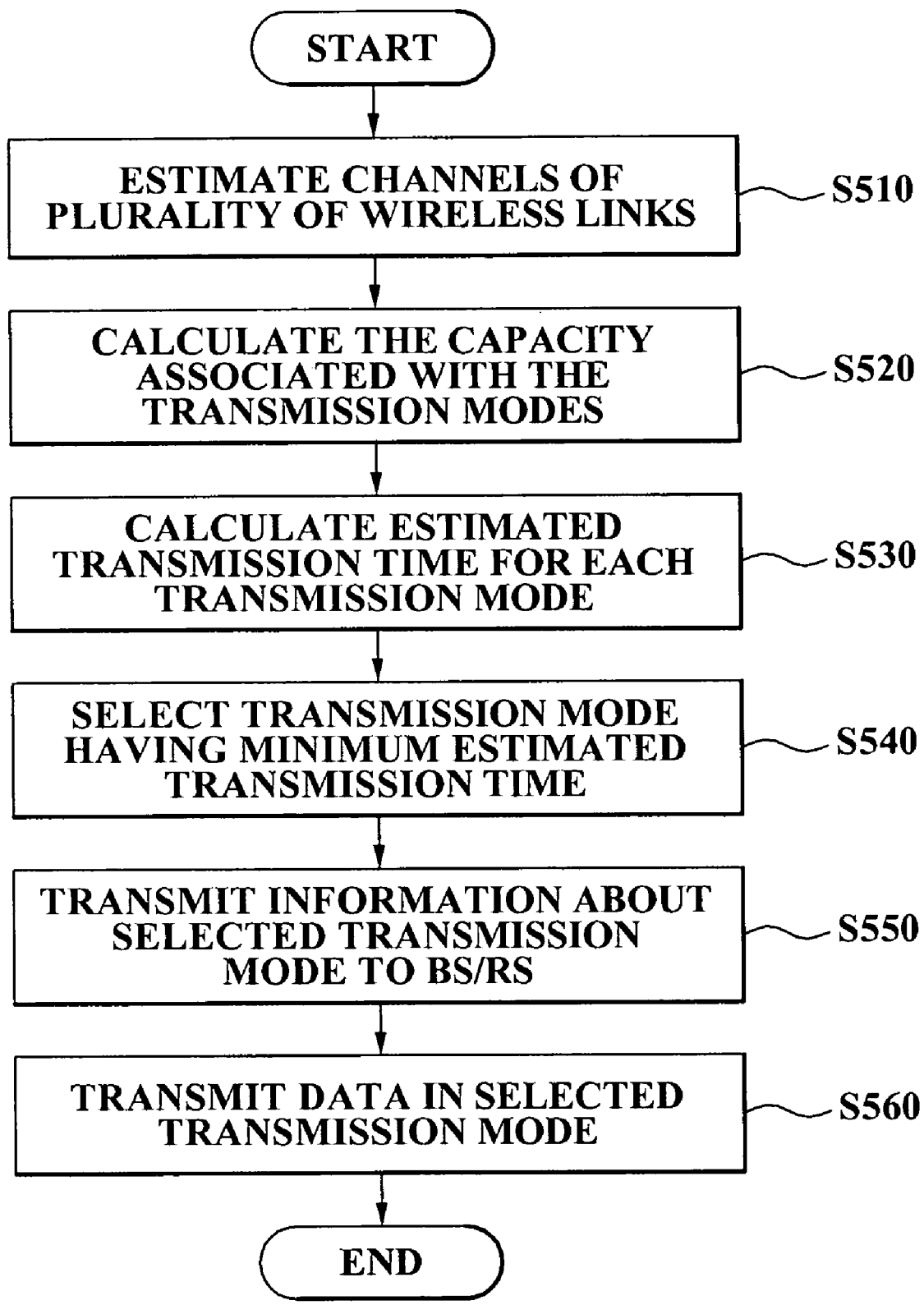
FIG. 5 is a flowchart illustrating a method of controlling a data transmission according to an exemplary embodiment of the present invention.

Referring to FIG. 5, in operation S510, the MS 130 estimates channels of a plurality of wireless links that respectively connect the BS 110, the RS 120, and the MS 130 to each other. Here, the estimated channels include channels associated with the BS-MS link, the BS-RS link, and the RS-MS link.

In operation S520, the MS 130 calculates the capacity values associated with a plurality of transmission modes, based on a channel estimation value. The transmission mode may include at least one of the direct transmission mode 310, the diversity mode 320, and the spatial multiplexing mode 330.

In operation S530, the MS 130 calculates an estimated transmission time for each of the plurality of transmission modes. In operation S540, the MS 130 may select a transmission mode, which has a minimum estimated transmission time, as the optimal transmission mode. A method of calculating the estimated transmission time for each transmission mode has been described above in detail. Thus, further detailed description will be omitted.

In operation S550, the MS 130 transmits information about the selected transmission mode to the BS 110 or the RS 120. In operation S560, the BS 110 and the RS 120 may transmit data to the MS 130 depending upon the selected transmission mode.

FIG. 5 illustrates a method of calculating an estimated transmission time for each transmission mode, directly selecting a transmission mode, and transmitting information about the selected transmission mode to the BS 110 and the RS 120 by the MS 130. However, according to another exemplary embodiment of the present invention, the BS 110 or the RS 120 may receive a channel estimation value or channel capacity information from the MS 130 and select an optimal transmission mode based on the received channel estimation value or channel capacity information. Specifically, all operations S520 through S540 are omitted by the MS 130, and at least one of operations S520 through S540 is performed by the BS 110 or the RS 120.

According to the initially-described exemplary embodiment, an amount of control information to be transmitted to the BS 110 and the RS 120 may be reduced. Also, since a plurality of entities of determining a transmission mode is unified, the system may be easily constructed. However, according to the subsequently-described exemplary embodiment, when a process of calculating a channel capacity based on an estimated channel value is complex, a calculation burden of the MS 130 may be reduced. Specifically, since limited hardware resources of the MS 130 may be effectively utilized and a complexity of the MS 130 may be decreased, manufacturing costs may be reduced.

A method of controlling a data transmission according to an aspect of the present invention may be classified into two types of schemes according to an operation of the RS 120. The two types of methods include an amplify-and-forward (AF) scheme which functions as only a repeater that amplifies and forwards a received signal from the BS 110, and a decode-and-forward (DF) scheme which detects and decodes the received signal, encodes the decoded received signal at a predetermined code rate and forwards the encoded received signal.

In comparison to the AF scheme, the DF scheme has a complex structure for a construction and analysis thereof. However, when a code rate in the RS 120 is required to be appropriately determined, the DF scheme may help improve transmission throughput. According to an exemplary embodiment of the present invention, the code rate in the RS 120, which operates by the DF scheme, may be determined by the MS 130. Specifically, the MS 130 may adaptively change the code rate to be applied to the RS 120 according to a channel status by determining the code rate based on the measured channel value or channel capacity by the MS 130. Thus, according to the present exemplary embodiment, the data transmission may be more precisely controlled by more accurately reflecting the channel status. The above-described precise control is very important, especially when the MS 130 is moving and thus having channel characteristic change over time.

Figure 6:
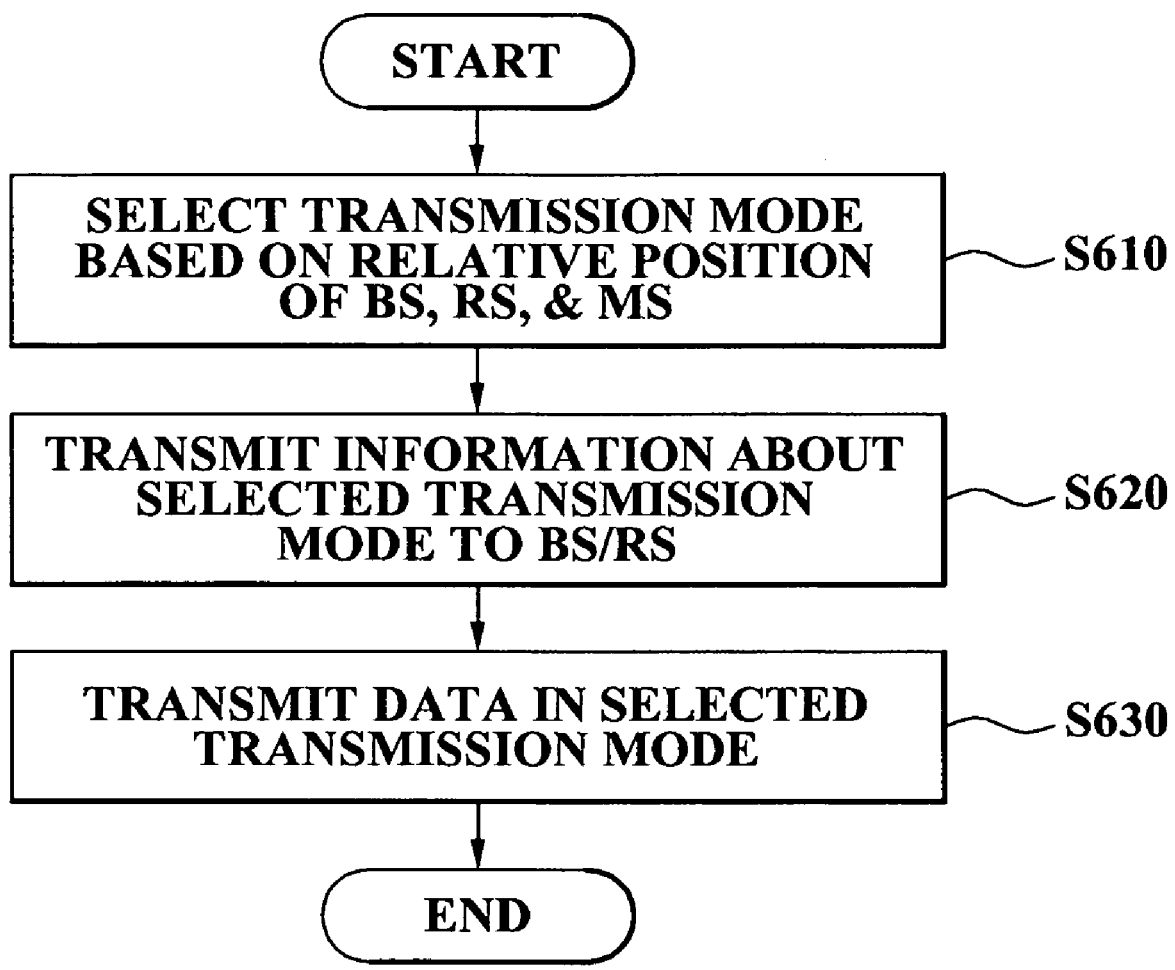
FIG. 6 is a flowchart illustrating a method of controlling a data transmission according to another exemplary embodiment of the present invention.

FIG. 6 is a flowchart illustrating a method of controlling a data transmission according to another exemplary embodiment of the present invention.

In operation S610, the MS 130 selects an optimal transmission mode from a plurality of transmission modes according to a relative positioning relation among the BS 110, the RS 120, and the MS 130.

In operation S620, the MS 130 transmits information about the selected optimal transmission mode to the BS 110 or the RS 120. Thus, in operation S630, the BS 110 and the RS 120 may transmit data according to the selected optimal transmission mode.

Unlike the above-described exemplary embodiment, in the present exemplary embodiment, since a factor that affects the channel value and the channel capacity includes the relative positioning location of the BS 110, the RS 120, and the MS 130, the optimal transmission mode is determined by the relative positioning relation among the BS 110, the RS 120, and the MS 130. Descriptions related thereto which will be clearly made from a simulation test result to be described later.

Figure 7:
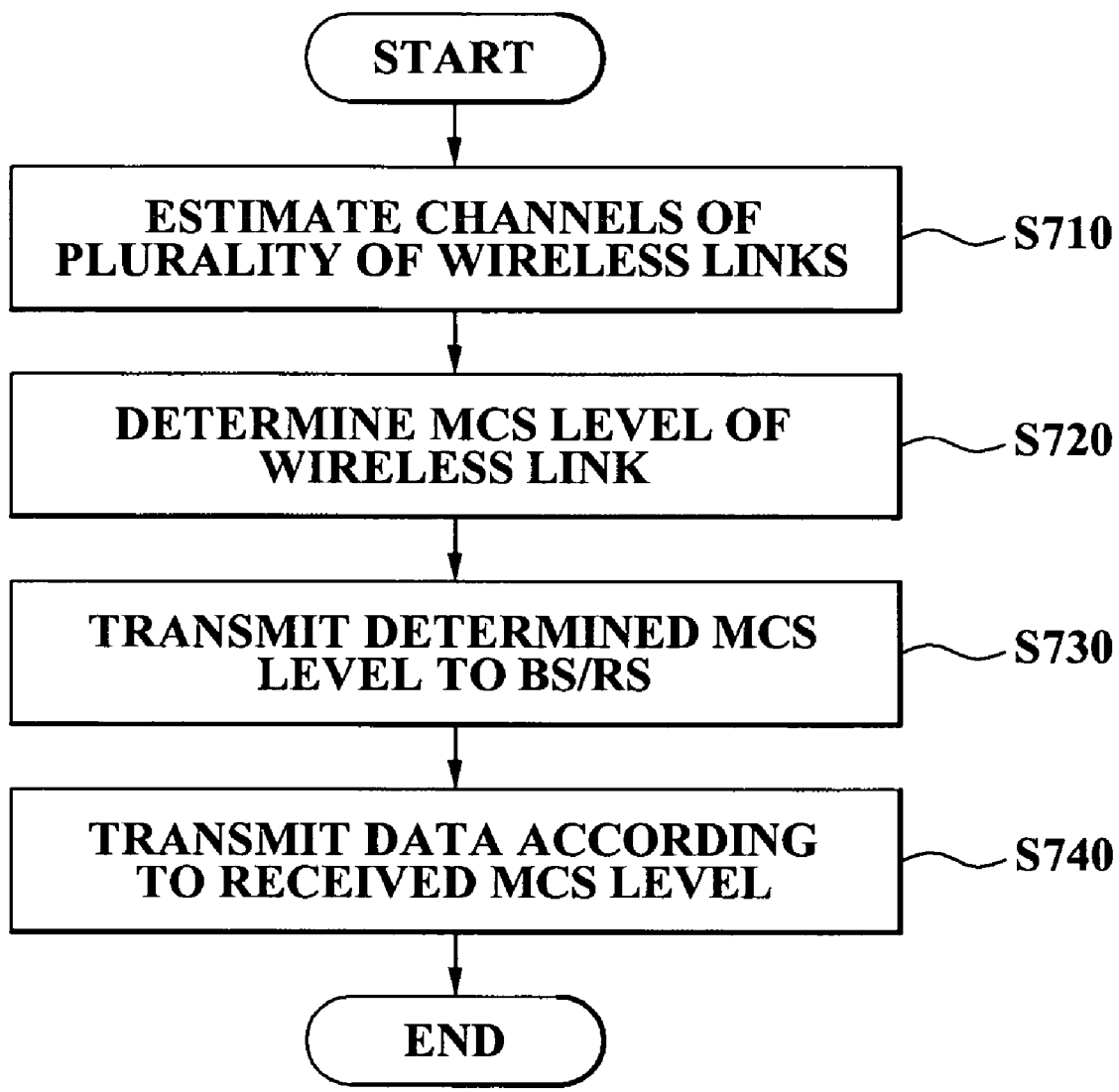
FIG. 7 is a flowchart illustrating a method of controlling a data transmission according to still another exemplary embodiment of the present invention.

FIG. 7 is a flowchart illustrating a method of controlling a data transmission according to still another exemplary embodiment of the present invention.

In operation S710, the MS 130 estimates channels of a plurality of wireless links that respectively connect the BS 110, the RS 120, and the MS 130 to each other.

In operation S720, the MS 130 determines a modulation and coding scheme (MCS) level of each of the plurality of wireless links, based on a channel estimation value. Here, the MCS level designates information, such as a modulation scheme of each of the plurality of wireless links, encoding, an encoding scheme, a code rate, and the like.

In operation S730, the determined MCS level by the MS 130 is transmitted to the BS 110 or the RS 120, so that the BS 110 and the RS 120 may transmit data according to the determined MCS level (operation S740). In this case, when the MCS level is transmitted to only one of the BS 110 and the RS 120, the BS 110 or the RS 120 that directly received the MCS may forward information about the received MCS level to the BS 110 or the RS 120 that did not directly receive the MCS level.

A method of controlling a data transmission according to an aspect of the present exemplary embodiment may more precisely control the data transmission by changing an MCS level according to a channel status.

A method of controlling a data transmission to improve throughput in a wireless relay system, including a BS, an RS, and an MS in a single cell, has been described above. For convenience of description, the present invention has been described based on when a single RS is contained in a single cell, but may be applicable as is when a plurality of RSs is contained in the single cell.

Figure 8:
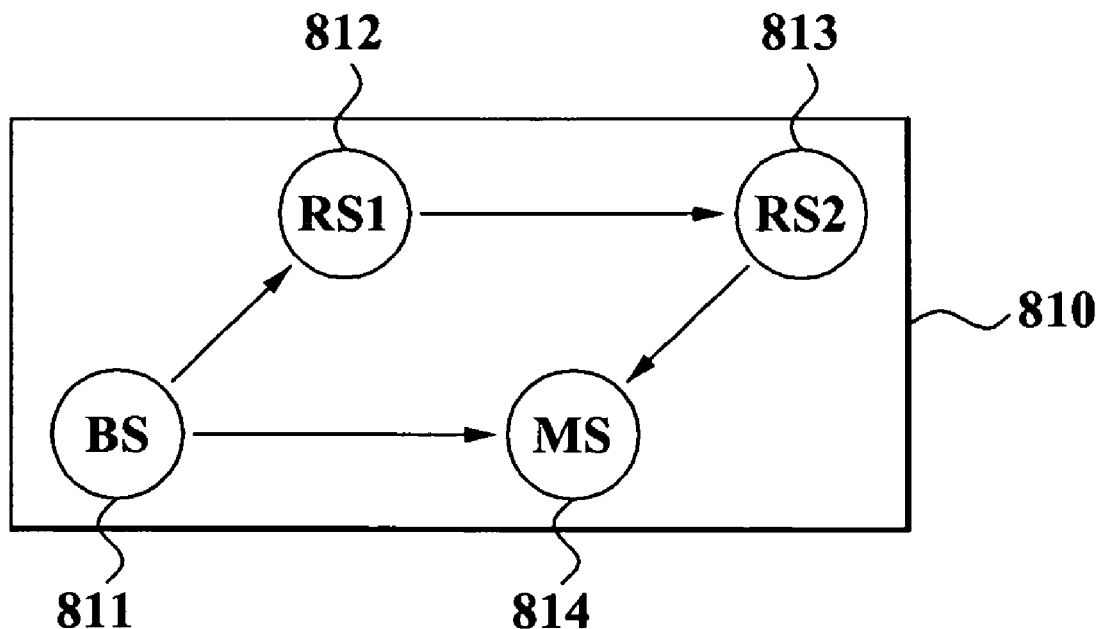
FIG. 8 illustrates a method of transmitting data via a plurality of RSs in a multi-hop relay system.
Figure 8:
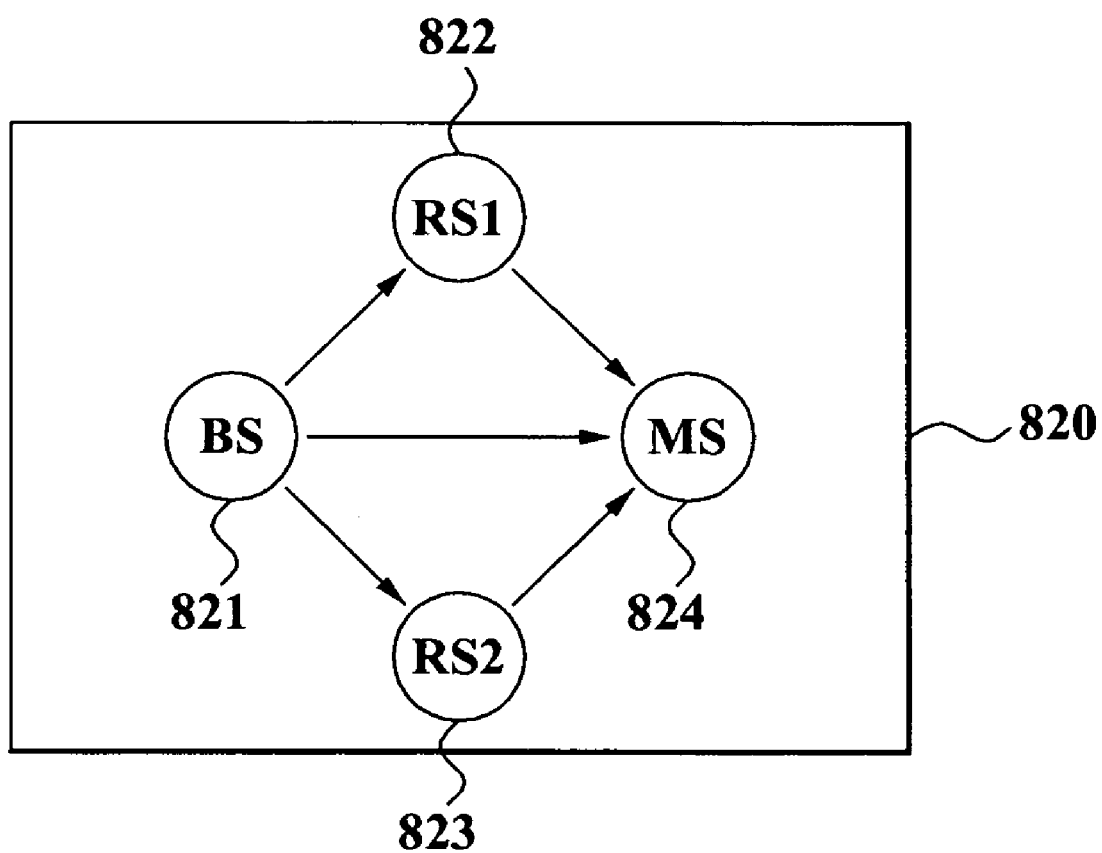

FIG. 8 illustrates two types of wireless link configurations when a plurality of RSs is contained in a single cell. As shown in FIG. 8, when the plurality of RSs is provided, it may be classified into two types.

The first type corresponds to a series-connection 810 when the plurality of RSs is connected in series. In this case, a first RS (RS1) 812 receives data from a BS 811 and forwards the received data to a second RS (RS2) 813. The second RS 813 forwards the data to an MS 814. Here, the BS 811 may transmit data to the MS 814 via a direct link thereto, such that the MS 814 may simultaneously receive data from the BS 811 and the second RS 813.

The second type corresponds to a parallel-connection 820 when the plurality of RSs is connected in parallel. In this case, a first RS (RS1) 822 and a second RS (RS2) 823 receive data from a BS 821 respectively, and forward the received data to an MS 824. At the same time, the BS 821 may directly transmit data to the MS 824, such that the MS 824 may simultaneously receive the data from the BS 821, the first RS 822, and the second RS 823.

Even when data is transmitted via a plurality of RSs as described above, the above-described data transmission control method may be applied as is. Here, the direct transmission mode 310 has no relation with a number of RSs.

In the case of the series-connection 810, an estimated transmission time in the diversity mode 320 and the spatial multiplexing mode 330 is required to additionally include an estimated transmission time of a link between the first RS 812 and the second RS 813. Also, when there is a single RS, partial data ratio α in the spatial multiplexing mode 330 may be calculated by using an open-loop capacity of a link between the second RS 813 and the MS 814 for an open-loop capacity of an RS-MS link.

In the case of the parallel-connection 820, to calculate the estimated transmission time in the diversity mode 320, a diversity capacity of the MS 824 that simultaneously receives data from the BS 821, the first RS 822, and the second RS 823 may be utilized. Also, to calculate the estimated transmission time in the spatial multiplexing mode 330, an overall estimated transmission time may be calculated by adding the estimated transmission time to transmit each corresponding partial data from the BS 821 to the first RS 822 and the second RS 823, and the estimated transmission time to directly transmit remaining partial data from the BS 821 to the MS 824. Here, partial data ratio $\alpha_1$ to be transmitted to the MS 824 via the first RS 822, partial data ratio $\alpha_2$ to be transmitted to the MS 824 via the second RS 823, and partial data ratio $\alpha_3$ to be directly transmitted from the BS 821 to the MS 824 are in proportion to each channel capacity of the link between the first RS 822 and the MS 824, the link between the second RS 823 and the MS 824, and the link between the BS 821 and the MS 824, respectively.

Also, the series-connection 810 and the parallel-connection 820 shown in FIG. 8 may be utilized together, depending upon circumstances. Specifically, while basically using the series-connection 810, data may be directly transmitted from the first RS 812 to the MS 814. Also, while using the parallel-connection 820, data may be forwarded between the first RS 822 and the second RS 823.

Figure 9:
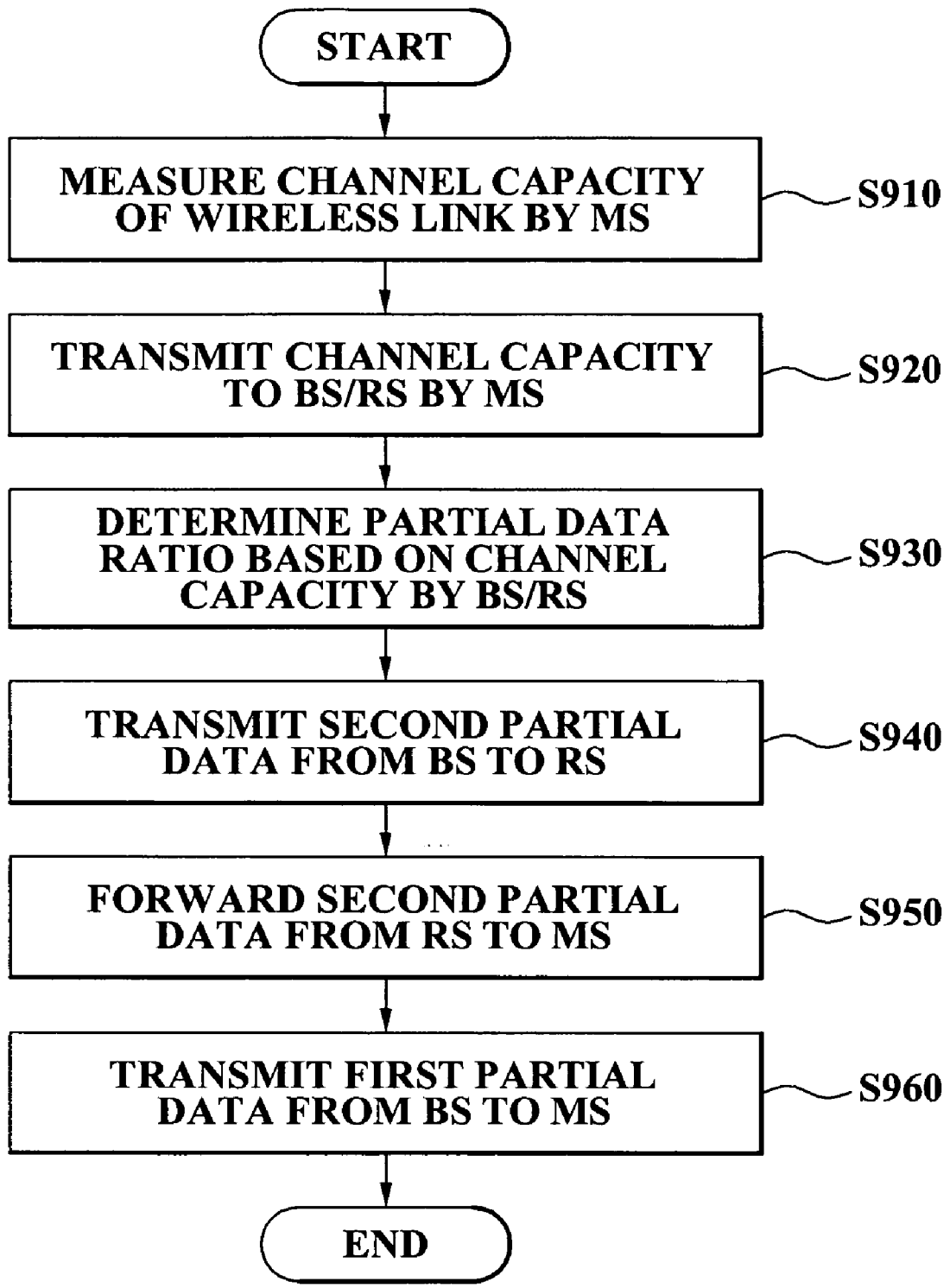
FIG. 9 is a flowchart illustrating a method of transmitting data in a spatial multiplexing transmission mode according to an exemplary embodiment of the present invention.
Figure 10:
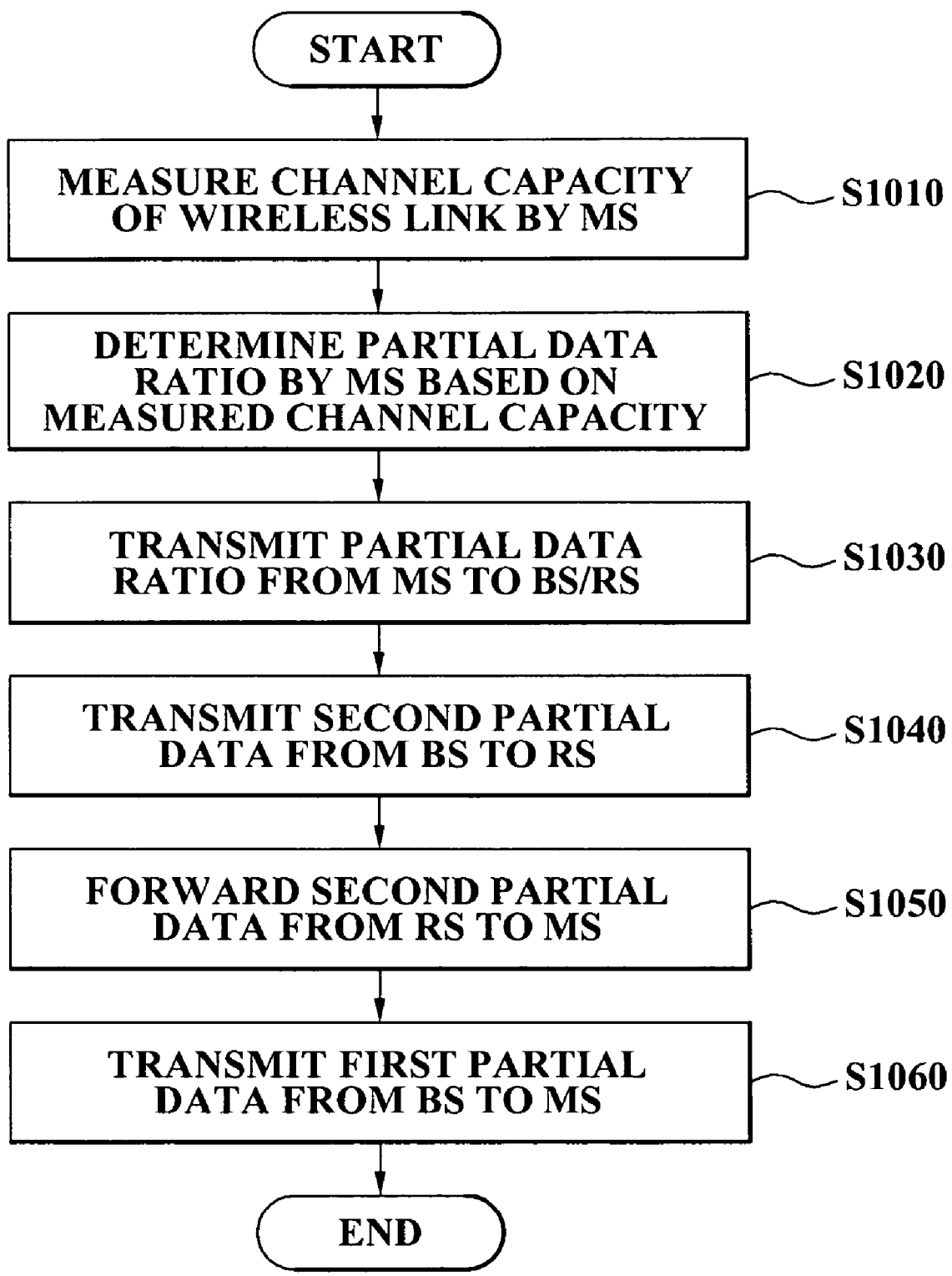
FIG. 10 is a flowchart illustrating a method of transmitting data in a spatial multiplexing transmission mode according to another exemplary embodiment of the present invention.

FIGS. 9 and 10 are flowcharts illustrating a method of transmitting data in the spatial multiplexing mode 330 which is another method consistent with the present invention.

Referring to FIG. 9, in operation S910, the MS 130 measures a channel capacity of each of a BS-MS link and an RS-MS link. Here, the measured channel capacity indicates an open-loop capacity when a channel of another link, excluding a corresponding link, is regarded as a noisy channel.

In operation S920, the MS 130 transmits information about the measured channel capacity to the BS 110 or the RS 120. In operation S930, the BS 110 or the RS 120 determines partial data ratio α, based on the received channel capacity information.

Also, in operation S930, the partial data ratio α may be calculated by the BS 110 and transferred to the RS 120. Conversely, the partial data ratio α may be calculated by the RS 120 and transferred to the BS 110. Also, the partial data ratio α may be calculated by both the BS 110 and the RS 120, and each calculated value may be synchronized to guarantee the accuracy of calculation. A detailed method of calculating the partial data ratio a has been described above, and thus further detailed description related thereto will be omitted.

In operation S940, second partial data of the partial data ratio α is transmitted from the BS 110 to the RS 120 by using the calculated partial data ratio α. In operation S950, the RS 120 receives and forwards the transmitted second partial data to the MS 130.

In operation S960, a ratio, 1-α, of first partial data is directly transmitted from the BS 110 to the MS 130 by using the determined partial data ratio α.

Here, operations S950 and S960 may be simultaneously performed after performing operation S940. Specifically, operation S940 is performed in a first time slot, and operations S950 and S960 are performed in a second time slot.

Referring to FIG. 10, in operation S1010, the MS 130 measures a channel capacity of for each wireless link. Here, operation S1010 corresponds to operation S910 of FIG. 9.

However, unlike FIG. 9, in operation S1020, the MS 130 directly determines partial data ratio α, based on the measured channel capacity.

In operation S1030, the MS 130 transmits the determined partial data ratio α to the BS 110 or the RS 120, so that the BS 110 may transmit data via a different path according to the determined partial data ratio α.

Operations S1040 through S1060 describe a process of transmitting data from the BS 110 to the MS 130, and exactly correspond to operations S940 through S960. Thus, descriptions related thereto will be omitted.

In FIGS. 9 and 10, an entity that determines the partial data ratio α is different. According to the exemplary embodiment of FIG. 9, when a process of calculating a channel capacity based on a measured channel value is complex, limited hardware resources of the MS 130 may be effectively utilized by reducing a calculation burden of the MS 130. According to the exemplary embodiment of FIG. 10, since an amount of control information to be transmitted to the BS 110 and the RS 120 may be reduced, a plurality of entities that determine a transmission mode is unified and thus, a configuration becomes simple.

Unlike the diversity mode 320 of transmitting total data via a plurality of paths and thereby acquiring a diversity gain, a method of transmitting data in the spatial multiplexing mode 330 divides the total data into a plurality of partial data and transmits the divided partial data to the MS 130 via different paths. Thus, throughput may be improved, and a cell capacity may be increased.

Also, in the method of transmitting data in the spatial multiplexing mode 330, described with reference to FIGS. 9 and 10, the RS 120 may decode the received second partial data, encode the decoded second partial data at a predetermined code rate, and forward the encoded second partial data to the MS 130.

In this case, the RS 120 may change the code rate of the second partial data to be forwarded according to the channel value or the channel capacity, which is measured by the MS 130. Specifically, system performance may be improved by adapting to a channel status. Even in this case, the code rate may be directly determined by the MS 130. Also, the code rate may be determined by the BS 110 or the RS 120 based on the channel value or the channel capacity received from the MS 130.

The data transmission method and data transmission control method according to the above-described exemplary embodiment of the present invention may be recorded in computer-readable media including program instructions to implement various operations embodied by a computer. The media may also include, alone or in combination with the program instructions, data files, data structures, and the like. Examples of computer-readable media include, but are not limited to magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines; or wave guides, and the like, including a carrier wave transmitting signals specifying the program instructions, data structures, and the like. Examples of program instructions may include both machine code, such as produced by a compiler, and files containing higher level code that may be executed by the computer using an interpreter. The described hardware devices may be configured to act as one or more software modules in order to perform the operations of the above-described exemplary embodiments of the present invention.

Also, an aspect of the present invention includes a wireless relay system that includes a BS, an MS, and at least one RS operating according to the above-described method.

The BS, included in the wireless relay system, directly transmits a first partial data ratio of total data to the MS, and transmits a second partial data ratio of the total data to the MS via the RS. Here, the total data is transmitted via a downlink. More specifically, the BS transmits the first partial data ratio to the RS in a first time slot. When the transmission is completed, the BS directly transmits the second partial data ratio to the MS in a second time slot. Here, the RS forwards the first partial data ratio, which is received from the BS, to the MS in the second time slot, so that the MS may simultaneously receive the first partial data from the BS and the second partial data from the RS, in the second time slot.

According to an exemplary embodiment of the present invention, the first partial data and the second partial data are contained in the total data, and the contents are different from each other. However, a portion of the first partial data and the second partial data to be transmitted via different paths may be designed to be duplicated to acquire some diversity gain.

The first ratio and the second ratio are determined based on a channel capacity of each wireless link, which is measured by the MS. Also, the MS may determine the first ratio and the second ratio based on a channel capacity measurement value with respect to a direct transmission link from the BS to the MS and a partial link from the RS to the MS, and then transmit information about the determined first partial ratio and the second partial ratio to the BS and the RS.

Also, the RS may transmit the partial data, which is received from the BS, to the MS as is, but may decode the received partial data, encode the decoded partial data at a predetermined code rate, and forward the encoded partial data to the MS. In this case, the code rate to be applied to the RS may be determined by the MS. Specifically, the code rate may be determined based on the channel capacity or the channel estimation value that is measured by the MS.

The present invention may be applied to a wireless relay system which selects an optimal transmission mode according to a relative position of each of an MS and an RS from the BS in a cell.

More specifically, in the wireless relay system, the MS measures channel capacity of a plurality of wireless links that respectively connect the BS, the RS, and the MS to each other, and selects an optimal transmission mode from the plurality of transmission modes based on the measured channel capacity. Here, the channel capacity which is measured by the MS to select a transmission mode, may include an open-loop capacity from the BS to the MS, a closed loop capacity from the BS to the RS, a diversity capacity from the RS to the BS, and an open-loop capacity via each link when different partial data is simultaneously transmitted from each of the BS and the RS to the MS.

The MS calculates an estimated transmission time to transmit a predetermined amount of data in each transmission mode by referring to various types of channel capacities, and selects a transmission mode, which has a minimum estimated transmission time, as an optimal transmission mode. Also, the MS may transmit information about the selected transmission mode to each of the BS and the RS, such that the BS and the RS may transmit and forward data in the optimal transmission mode.

Here, according to a configuration of the wireless relay system, the plurality of transmission modes may include at least one of a direct transmission mode, a diversity mode, and a spatial multiplexing mode. In the direct transmission mode, total data is directly transmitted via only a direct path from the BS to the MS. In the diversity mode, the total data is simultaneously transmitted via the direct path and an indirect path passing through at least one RS. In the spatial multiplexing mode, partial data of total data is transmitted to the MS via the direct path, and remaining data is transmitted to the MS via the indirect path passing through the at least one RS.

Figure 12:
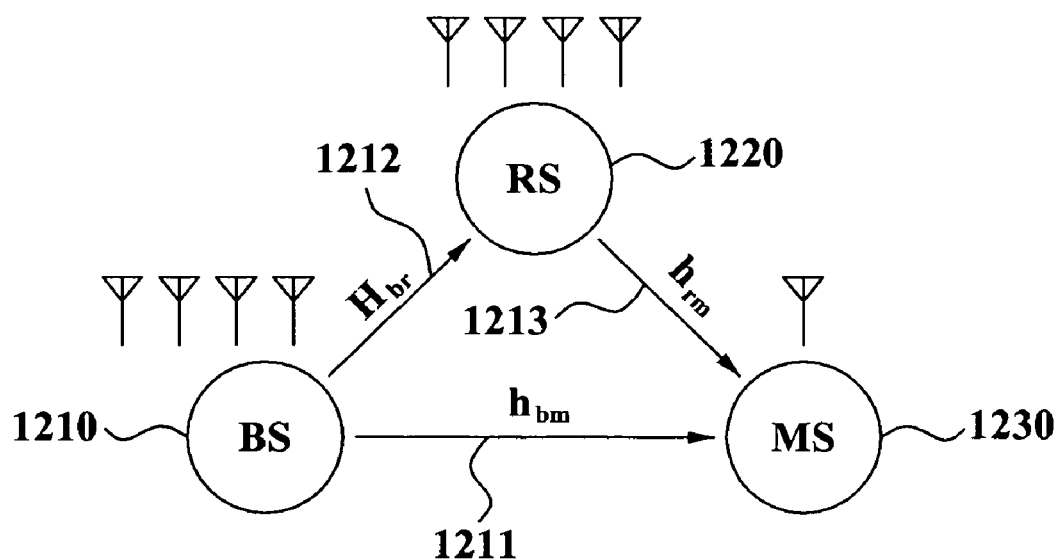
FIG. 12 is a diagram illustrating a wireless relay system according to another exemplary embodiment of the present invention.
Figure 13:
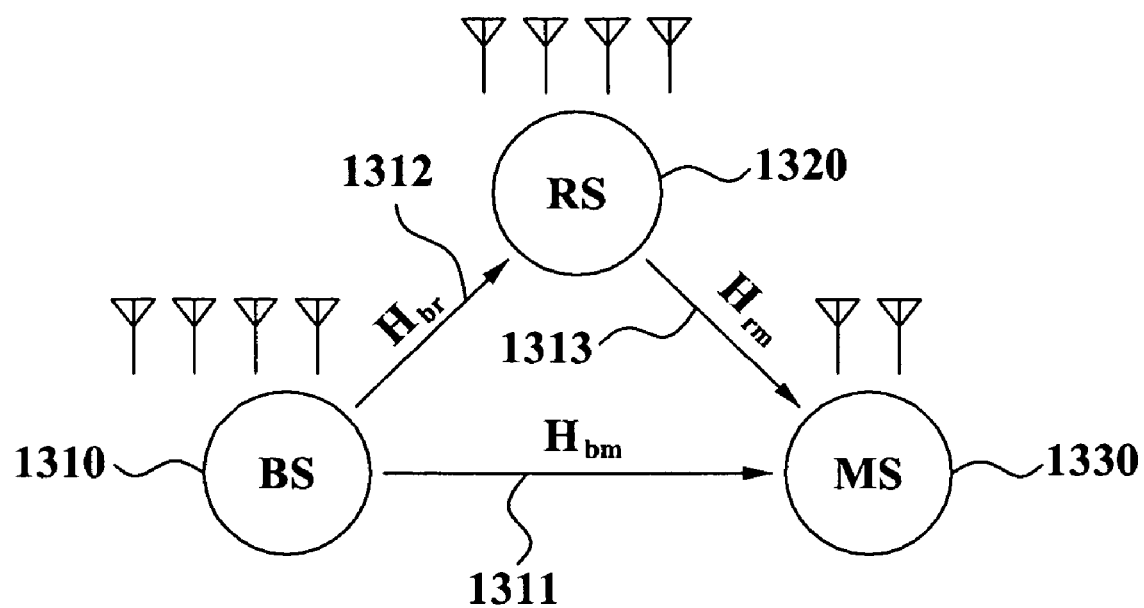
FIG. 13 is a diagram illustrating a wireless relay system according to still another exemplary embodiment of the present invention.

Examples of three transmission modes of the wireless relay system, as described above, are illustrated in FIGS. 11 through 13. When a number of antennas, which are provided in each of a BS, an RS, and an MS, is $N_b$, $N_r$, and $N_m$, FIG. 11 illustrates a system configuration where $(N_b, N_r, N_m)=(1, 1, 2)$, FIG. 12 illustrates $(N_b, N_r, N_m)=(4, 4, 1)$, and FIG. 13 illustrates $(N_b, N_r, N_m)=(4, 4, 2)$.

Figure 11:
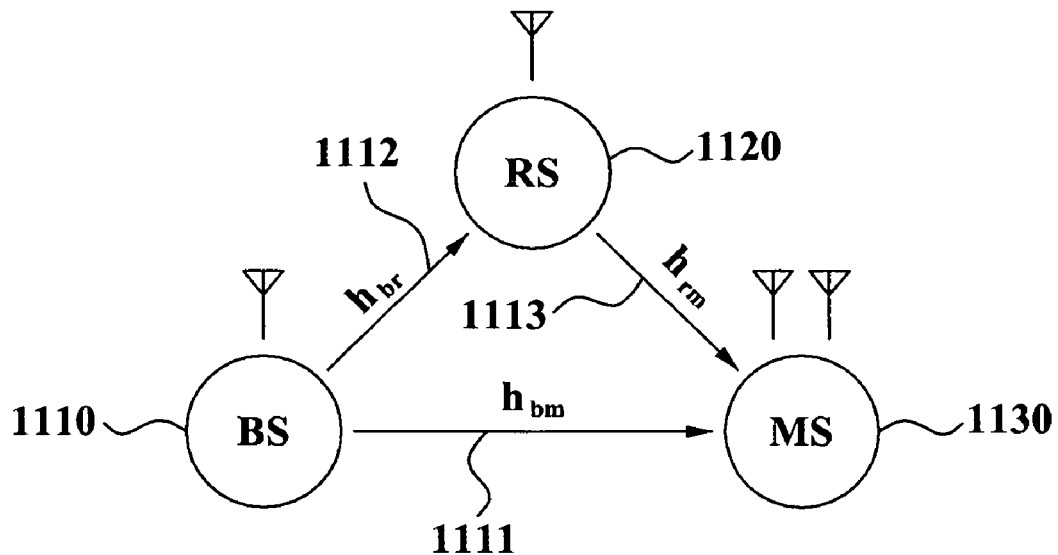
FIG. 11 is a diagram illustrating a wireless relay system according to an exemplary embodiment of the present invention.

In the wireless relay system as shown in FIG. 11, an MS 1130 includes two antennas. Thus, the direct transmission mode 310, the diversity mode 320, and the spatial multiplexing mode 330 are all supported. In FIG. 11, $h_{br}$ designates a scalar channel of a BS-RS link 1112, $h_{rm}$ designates a 2×1 vector channel of an RS-MS link 1113, and $h_{bm}$ designates a 2×1 vector channel of a BS-MS link 1111.

When it is assumed that received data is restored by using a Maximal Ratio Combining (MRC) technique, open-loop capacity $C_{bm}$ from a BS 1110 to an MS 1130 in the direct transmission mode 310 is calculated by $$C_{bm} = \log\left(1 + \frac{\|h_{bm}\|^2 P_b}{N_0}\right) \quad \text{[Equation 4]}$$

Also, since the BS-RS link 1112 is the scalar channel, closed loop capacity $C_{br}$ from the BS 1110 to an RS 1120, which is common in both the diversity mode 320 and the spatial multiplexing mode 330, may be calculated by $$C_{br} = \log\left(1 + \frac{|h_{br}|^2 P_b}{N_0}\right) \quad \text{[Equation 5]}$$

Also, when the MS 1130 simultaneously receives data from the BS 1110 and the RS 1120 by using two antennas in the diversity mode 320, the wireless relay system may acquire a 4th-order transmitting/receiving diversity gain. In this case, diversity capacity $C_{div}$ is calculated by $$C_{div} = \log\left(1 + \frac{P_r\|h_{rm}\|^2 + P_b\|h_{bm}\|^2}{N_0}\right) \quad \text{[Equation 6]}$$

Also, open-loop capacity $C_{sm1}$ from the BS 1110 to the MS 1130 and open-loop capacity $C_{sm2}$ from the RS 1120 to the BS 1110, which are utilized to calculate the estimated transmission time in the spatial multiplexing mode 330, are represented as $$C_{sm1} = \log(1+\text{SINR}_1), C_{sm2} = \log(1+\text{SINR}_2). \quad \text{[Equation 7]}$$

Further, in Equation 7, $$\text{SINR}_1 = h_{bm}^H\left(H_{bm}H_{bm}^H + \frac{N_0}{P_b}I_2\right)^{-1} h_{bm}, \text{ and}$$

$$\text{SINR}_2 = \frac{\|h_{rm}\|^2 P_r}{N_0}, H_{bm} = [h_{bm}\ 0].$$

Here, $P_b$ designates a transmitted power at the BS 1110, Pr designates a transmitted power at the RS 1120, and $N_0$ designates a noise variance per each antenna at the MS 1130.

The above-described analysis was made based on a case in which data is received using an MRC technique of Space-Time Block Coding (STBC) in the diversity mode 320, and using an Ordered Successive Interference Cancellation-Minimum Mean Square Error (OSIC-MMSE) based algorithm in the spatial multiplexing mode 330.

FIGS. 12 and 13 illustrate a configuration of a wireless relay system which is expected to be applied to the International Mobile Telecommunication (IMT)-Advanced standardization and fourth generation mobile communication system. In the wireless relay system as shown in FIG. 12, an MS 1230 includes a single antenna. Thus, only the direct transmission mode 310 and the diversity mode 320 are supported.

In FIG. 12, $H_{br}$ designates a 4×4 channel matrix of a BS-RS link 1212, $h_{bm}$ designates a 1×4 channel vector of a BS-MS link 1211, and $h_{rm}$ designates a 1×4 channel vector of an RS-MS link 1213.

When a direct transmission from the BS 1210 to the MS 1230 is considered in the direct transmission mode 310, a fill-diversity full-rate (FDFR) system is possible. In this case, open-loop capacity $C_{bm}$ from the BS 1210 to the MS 1230 is represented as $$C_{bm} = \log\left(1 + \frac{\|h_{bm}\|^2 P_b}{N_0 N_b}\right) \quad \text{[Equation 8]}$$

Closed loop capacity $C_{br}$ from the BS 1210 to an RS 1220 in the diversity mode 320 may be calculated by using a 4×4 MIMO closed loop capacity, and represented as $$C_{br} = \sum_{i=1}^{N_b} \log\left(1 + \frac{P^*_{b,i}}{N_0}\lambda_i^2\right) \quad \text{[Equation 9]}$$

where $\lambda_i$ designates an eigen value corresponding to an $i^{th}$ antenna of $H_{br}$, and $P^*_{b,i}$ designates an optimal power allocation of the $i^{th}$ antenna, and is given by $$P^*_{b,i} = \left(\frac{1}{\mu} - \frac{N_0}{\lambda_i^2}\right)^+ \quad \text{[Equation 10]}$$

where $x^+ := \max(x, 0)$, and $\mu$ designates a value that satisfies $$\sum_{i=1}^{4}\left(\frac{1}{\mu} - \frac{N_0}{\lambda_i^2}\right)^+ = P_b \quad \text{[Equation 11]}$$

When the diversity capacity $C_{div}$ is calculated based on the above-described FDFR system, the result is given by $$C_{div} = \log\left[1 + \frac{(\|h_{bm} + h_{rm}\|^2)(P_b + P_r)}{N_b N_0}\right] \quad \text{[Equation 12]}$$

In the wireless relay system as shown in FIG. 13, $H_{br}$ designates a 4×4 channel matrix of a BS-RS link 1312, $H_{bm}$ designates a 2×4 MIMO channel matrix of a BS-MS link 1311, and $H_{rm}$ designates a 2×4 channel matrix of an RS-MS link 1313. The wireless relay system of FIG. 13 supports all of the direct transmission mode 310, the diversity mode 320, and the spatial multiplexing mode 330. Thus, the wireless relay system of FIG. 13 selects an optimal transmission mode from the three transmission modes based on a channel capacity measured by an MS, and operates according to the selected optimal transmission mode.

An analysis of the wireless relay system as shown in FIG. 13 may be performed by establishing a signal model when a transmitting end is formed using a double space time transmit diversity (DSTTD) based algorithm, and a receiving end is formed using an OSIC-MMSE based algorithm.

Although descriptions related to a detailed calculation process of a channel capacity to calculate an estimated transmission time in each transmission mode of FIG. 13 will be omitted, the present invention may be applied to a wireless relay system formed of $(N_b, N_r, N_m) = (4, 4, 2)$, based on the signal model.

The above-described descriptions may be applied to the wireless relay system formed of $(N_b, N_r, N_m) = (1, 1, 2)$ and $(N_b, N_r, N_m) = (4, 4, 1)$ that are illustrated in FIGS. 11 and 12. Specifically, an aspect of the present invention may include a case in which the calculated channel capacity through the calculation process based on the above-described signal model is utilized, and also may widely include a case in which an optimal transmission mode is selected by calculating an estimated transmission time based on a channel capacity, the channel capacity being calculated by a different method from a different type of signal model.

Figure 14:
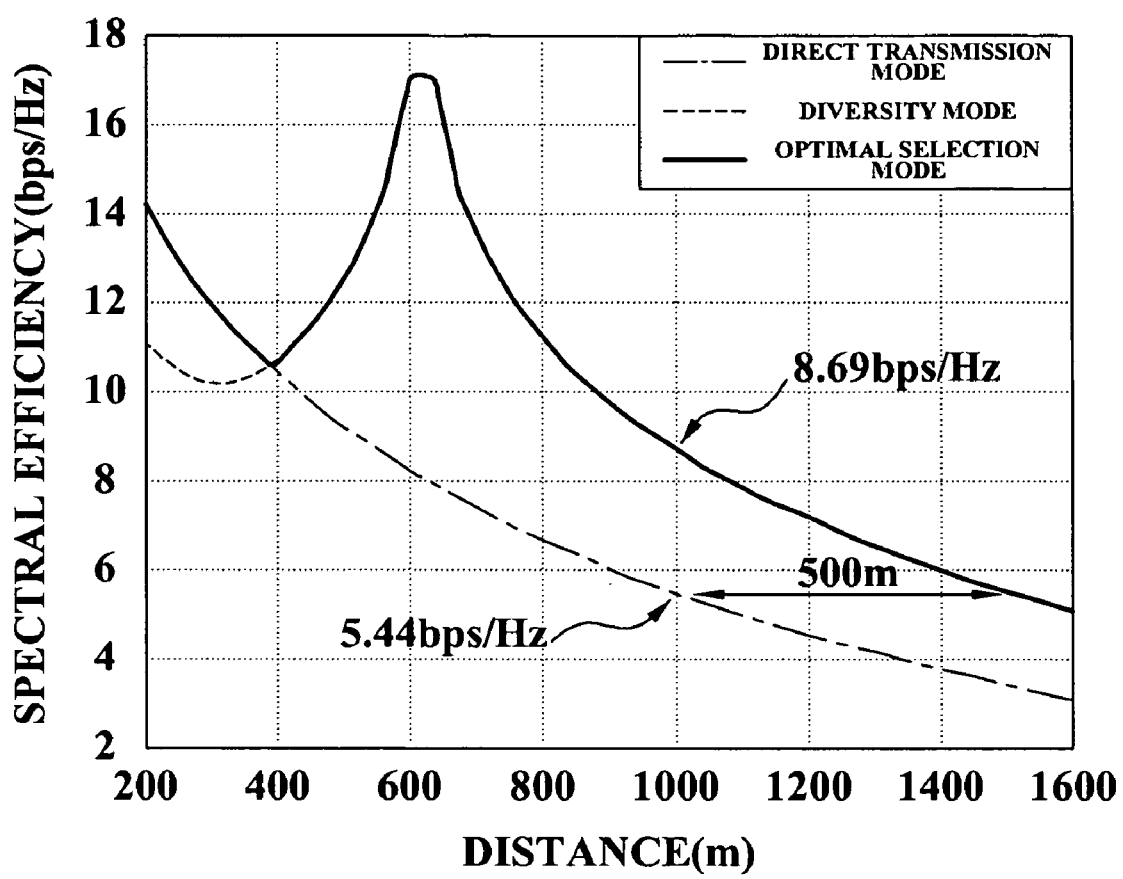
FIG. 14 is a graph illustrating a simulation test result of a wireless relay system according to the exemplary embodiment of FIG. 12.
Figure 15:
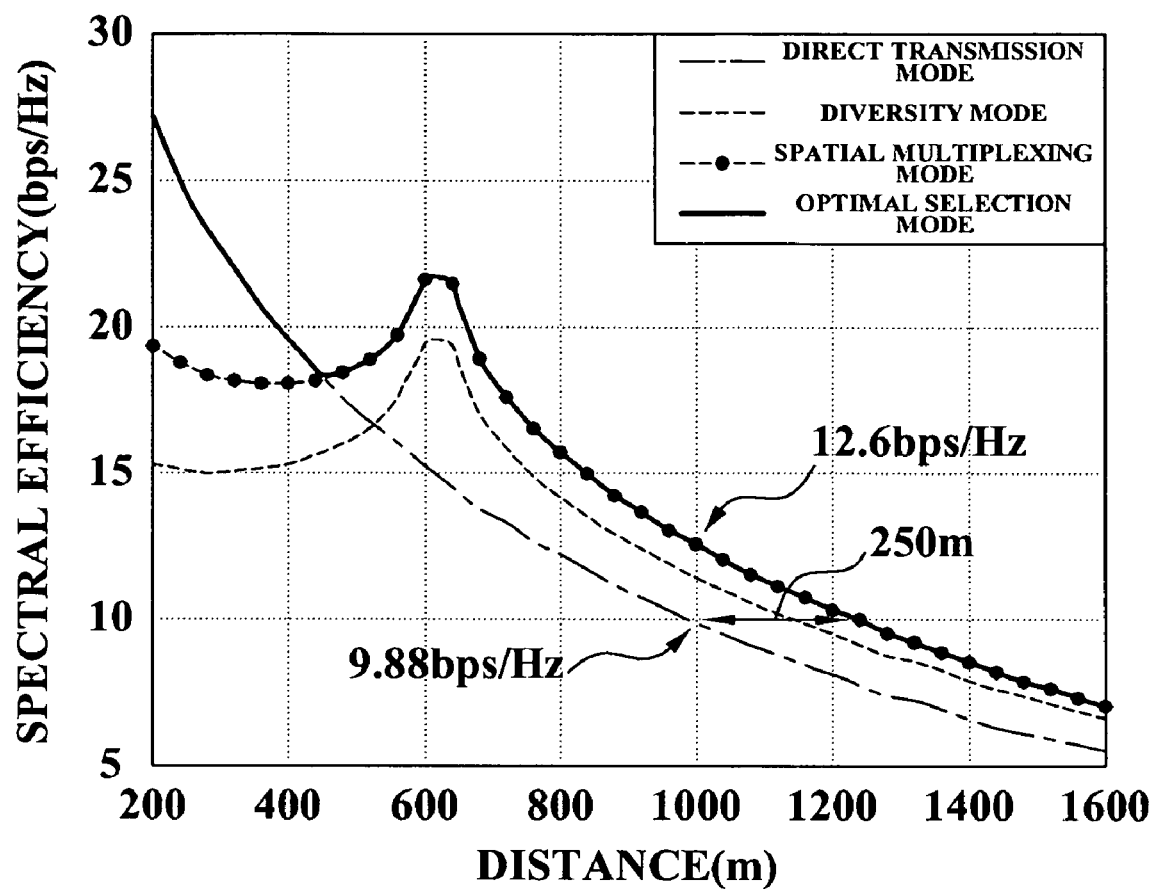
FIG. 15 is a graph illustrating a simulation test result of a wireless relay system according to the exemplary embodiment of FIG. 13.

FIGS. 14 and 15 are graphs illustrating a simulation test result for verifying the data transmission control method, based on the wireless relay system as shown in FIGS. 12 and 13, respectively.

A path loss model used for the simulation test is given by $$PL = 20\log_{10}\left(\frac{4\pi d_0}{\lambda}\right) + 10\gamma\log_{10}\left(\frac{d}{d_0}\right) + s \quad \text{[Equation 13]}$$

Hereinafter, parameters for the path loss mode will be briefly described. Here, d designates a distance between a BS and an MS, and $d_0$ is set to 100 m. Also, $h_b$ designates a vertical height of the BS, and s designates shadowing. $\lambda$ is set to 0.15 m, based on when central frequency $f_c$ is about 2 GHz, and an γ value, as represented as $-bh_b+c/h_b$, is set to 3.28. A γ value for a BS-MS link is determined to be 3.76, and a γ value for an RS-MS link is determined to be 4.

For other parameters used in the simulation test, $P_b$ is fixed to 43 dBm, $P_r$ to 40 dBm, frequency band to 10 MHz, thermal noise to −174 dB/Hz, noise figure to 8 dB, and a distance between the BS and an RS to 620 m, while systematically changing the distance between the BS and the MS within the range of about 200 m to about 1600 m.

FIG. 14 illustrates a spectral efficiency when an optimal transmission mode is selected from two transmission modes, based on the direct transmission mode 310, the diversity mode 320, and a channel capacity, in the wireless relay system as shown in FIG. 12.

Referring to FIG. 14, when the distance between the BS and the MS is less than about 400 m, the direct transmission mode 310 has the best transmission performance. Also, when the distance between the BS and the MS is greater than about 400 m, the diversity mode 320, which is a cooperative transmission method and is used with the RS, has the best transmission performance.

Thus, according to an aspect of the present invention, when the distance between the BS and the MS is less than about 400 mm, the wireless relay system operates in the direct transmission mode 310. Also, when the distance between the BS and the MS is greater than about 400 m, the wireless relay system operates in the diversity mode 320. Through the above-described operations, an optimal performance may be acquired.

More specifically, in comparison of when data is directly transmitted from the BS to the MS without passing through the RS, when the distance between the BS and the MS is about 1 km, data transmission throughput increases about 1.6 times, from 5.44 bps/Hz to 8.69 bps/Hz. Also, based on the 5.44 bps/Hz throughput, the radius of a cell increases about 500 m, from about 1 km to about 1.5 km.

FIG. 15 illustrates a spectral efficiency for each transmission mode in the wireless relay system as shown in FIG. 13. As described above, the wireless relay system of FIG. 13 supports all of the direct transmission mode 310, the diversity mode 320, and the spatial multiplexing mode 330. Thus, the graph illustrated in FIG. 15 shows system performance of when a transmission mode is fixed to each of the three transmission modes, and the system performance of when an optimal transmission mode is selected from the three transmission modes depending upon a distance between a BS and an MS, and data is transmitted according to the selected optimal transmission mode.

Referring to FIG. 15, when the distance between the BS and the MS is less than about 500 m, the direct transmission mode 310 has the best transmission performance. When the distance between the BS and the MS is greater than about 500 m, the spatial multiplexing mode 330, which utilizes the RS, has the best transmission performance.

In many cases, it can be seen that the transmission performance is better in the spatial multiplexing mode 330 than in the diversity mode 320, which verifies a performance improvement effect of the spatial multiplexing mode 330, which is a new type of data transmission method according to an aspect of the present invention.

More specifically, in comparison to the conventional direct transmission method, data transmission throughput increases about 1.3 times, from 9.88 bps/Hz to 12.6 bps/Hz, when the distance from the BS is about 1 km. Also, based on the 9.88 bps/Hz throughput, the radius of the cell increases about 250 m, from about 1 km to about 1.25 km.

The wireless relay system according to an aspect of the present invention has been described with reference to FIGS. 11 through 15. The detailed descriptions, which have been described according to the above-described exemplary embodiments with reference to FIGS. 3 through 10, may be applied to the above-described wireless relay system as they are. Thus, further detailed description related to the wireless relay system will be omitted.

According to an aspect of the present invention, there is provided a data transmission method, a data transmission control method, and a wireless relay system for performing the method, which can adaptively change a data transmission mode depending upon a location of an MS and an RS in a cell.

Also, according to an aspect of the present invention, it is possible to improve data transmission throughput by selecting any one transmission mode from a direct transmission mode, a diversity transmission mode, and a spatial multiplexing mode based on a channel capacity for each wireless link, and transmitting information about the selected transmission mode to a BS and an RS, so that the BS and the RS may transmit data according to the selected transmission mode.

Also, according to an aspect of the present invention, there is provided a new data transmission method using a spatial multiplexing mode, which can acquire a multiplexing gain by transmitting total data at different ratios via a direct transmission path from a BS to an MS and an indirect path using an RS.

Also, according to an aspect of the present invention, it is possible to more accurately control a data transmission by determining an MCS level of a BS and an RS based on a channel capacity of each wireless link that is measured by an MS.

Also, according to an aspect of the present invention, it is possible to increase a cell capacity of a mobile communication system by improving throughput of a downlink data transmission from a BS to an MS when a cell radius is fixed. Specifically, it is possible to increase a number of users that can be supported in an individual cell, and also to increase a data rate that can be supported for an individual.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of transmitting data via a downlink channel in a wireless relay system, the method comprising:
   transmitting a first ratio of first partial data of the data from a base station to a mobile station;
   transmitting a second ratio of second partial data of the data from the base station to a first relay station; and
   forwarding the second partial data from the first relay station to the mobile station,
   wherein the first ratio or the second ratio is determined based on any one of a channel capacity of a first link between the base station and the mobile station, and a channel capacity of a second link between the first relay station and the mobile station, and
   wherein the transmitting of the first partial data and the forwarding of the second partial data are simultaneously performed after transmitting the second partial data,
   wherein executing the transmitting the first partial data, the transmitting the second partial data, and forwarding the second partial data is when a distance between the mobile station and the base station in the wireless relay system is above a predetermined threshold and executing a different mode of transmitting when the distance between the mobile station and the base station in the wireless relay system is equal to or less than the predetermined threshold.

2. The method of claim 1, further comprising:
   receiving at least one of the channel capacity of the first link and the channel capacity of the second link, wherein said channel capacity of the first link and said channel capacity of the second link are measured by the mobile station.

3. The method of claim 2, wherein the base station determines the first ratio and the second ratio based on at least one of the channel capacity of the first link and the channel capacity of the second link.

4. The method of claim 1, further comprising:
   measuring the channel capacity of the first link and the channel capacity of the second link by the mobile station;
   determining the first ratio and the second ratio by the mobile station, based on at least one of the channel capacity of the first link and the channel capacity of the second link; and
   transmitting the determined first ratio and the determined second ratio to the base station or the first relay station.

5. The method of claim 1, wherein the first ratio $\alpha_1$ and the second ratio $\alpha_2$ are determined according to the following equations, $$\alpha_1 = \frac{C_{sm1}}{C_{sm1} + C_{sm2}},$$

$$\alpha_2 = \frac{C_{sm2}}{C_{sm1} + C_{sm2}}$$

where $C_{sm1}$ designates the channel capacity of the first link, and $C_{sm2}$ designates the channel capacity of the second link.

6. The method of claim 1, wherein the forwarding comprises:
decoding the received second partial data from the base station; and
encoding the decoded second partial data at a predetermined code rate to forward to the mobile station.

7. The method of claim 6, wherein the code rate is determined by the mobile station, based on at least one of the channel capacity of the first link and the channel capacity of the second link.

8. The method of claim 1, further comprising:
receiving and forwarding of the data by a second relay station,
wherein the forwarding of the second partial data comprises:
forwarding the second partial data, received from the base station, from the first relay station to the second relay station; and
forwarding the second partial data, received from the first relay station, from the second relay station to the mobile station.

9. A method of transmitting data via a downlink channel in a wireless relay system, the method comprising:
directly transmitting first partial data from a base station to a mobile station; and
transmitting second partial data from the base station to the mobile station via at least one relay station,
wherein the first partial data and the second partial data are contained in a total of the data transmitted from the base station and are different from each other, and
wherein the transmitting of the first partial data from the base station to the mobile station and transmitting of the second partial data from the at least one relay station to the mobile station are simultaneously performed after the second partial data is transmitted from the base station to the at least one relay station,
wherein executing the transmitting the first partial data, the transmitting the second partial data, and forwarding the second partial data is when a distance between the mobile station and the base station in the wireless relay system is above a predetermined threshold and executing a different mode of transmitting when the distance between the mobile station and the base station in the wireless relay system is equal to or less than the predetermined threshold.

10. A method of controlling a data transmission in a wireless relay system, the method comprising:
estimating channels of a plurality of wireless links that respectively connect a base station, a relay station, and a mobile station to each other;
selecting any one of a plurality of transmission modes by the mobile station, based on a channel estimation value; and
transmitting information about the selected transmission mode to the base station and the relay station,
wherein the plurality of transmission modes comprises at least one of:
a first mode which directly transmits total data from the base station to the mobile station;
a second mode which directly transmits the total data from the base station to the mobile station, and transmits the total data from the base station to the mobile station via the relay station; and
a third mode which directly transmits a certain portion of the total data from the base station to the mobile station, and transmits remaining data from the base station to the mobile station via the relay station, and
wherein the base station and the relay station transmit the data according to the selected transmission mode, and
wherein the selecting of one of the first mode, the second mode, and the third mode depends on a distance between the mobile station and the base station in the wireless relay system.

11. The method of claim 10, wherein the estimating comprises:
estimating a channel of a first link between the base station and the mobile station, by the mobile station;
estimating a channel of a second link between the relay station and the mobile station, by the mobile station; and
receiving a second channel estimation value of a third link between the base station and the relay station, by the mobile station.

12. The method of claim 10, wherein the selecting comprises:
calculating a channel capacity associated with the plurality of wireless links, based on the channel estimation value;
calculating an estimated transmission time of the data in each of the plurality of transmission modes, based on the calculated channel capacity; and
selecting a transmission mode with a minimum estimated transmission time from the plurality of transmission modes.

13. The method of claim 12, wherein the channel capacity comprises an open-loop capacity from the base station to the mobile station when the transmission mode is the first mode.

14. The method of claim 12, wherein the channel capacity comprises a closed loop capacity from the base station to the relay station, and a diversity capacity from the base station and the relay station to the mobile station, when the transmission mode is the second mode.

15. The method of claim 12, wherein the channel capacity comprises a closed loop capacity from the base station to the relay station, an open-loop capacity from the base station to the mobile station, and an open-loop capacity from the relay station to the mobile station, when the transmission mode is the third mode.

16. The method of claim 12, wherein the estimated transmission time $T_1$ of the first mode is calculated according to the following equation, $$T_1 = B/C_{bm}$$

where B designates a number of bits of transmitted data, and $C_{bm}$ designates an open-loop capacity from the base station to the mobile station.

17. A method of controlling a data transmission in a wireless relay system, the method comprising:
estimating channels of a plurality of wireless links that respectively connect a base station, a relay station, and a mobile station to each other;

selecting any one of a plurality of transmission modes by the mobile station, based on a channel estimation value; and transmitting information about the selected transmission mode to the base station and the relay station, wherein the plurality of transmission modes comprises at least one of:
- a first mode which directly transmits total data from the base station to the mobile station;
- a second mode which directly transmits the total data from the base station to the mobile station, and transmits the total data from the base station to the mobile station via the relay station; and
- a third mode which directly transmits a certain portion of the total data from the base station to the mobile station, and transmits remaining data from the base station to the mobile station via the relay station, wherein the base station and the relay station transmit the data according to the selected transmission mode, wherein the selecting comprises:
- calculating a channel capacity associated with the plurality of wireless links, based on the channel estimation value;
- calculating an estimated transmission time of the data in each of the plurality of transmission modes, based on the calculated channel capacity; and
- selecting a transmission mode with a minimum estimated transmission time from the plurality of transmission modes, and wherein the estimated transmission time $T_2$ of the second mode is calculated according to the following equation, $$T_2 = B/C_{br} + B/C_{div}$$

where B designates a number of bits of transmitted data, $C_{br}$ designates a closed loop capacity from the base station to the relay station, and, $C_{div}$ designates a diversity capacity from the base station and the relay station to the mobile station.

18. A method of controlling a data transmission in a wireless relay system, the method comprising:

estimating channels of a plurality of wireless links that respectively connect a base station, a relay station, and a mobile station to each other;

selecting any one of a plurality of transmission modes by the mobile station, based on a channel estimation value; and transmitting information about the selected transmission mode to the base station and the relay station, wherein the plurality of transmission modes comprises at least one of:
- a first mode which directly transmits total data from the base station to the mobile station;
- a second mode which directly transmits the total data from the base station to the mobile station, and transmits the total data from the base station to the mobile station via the relay station; and
- a third mode which directly transmits a certain portion of the total data from the base station to the mobile station, and transmits remaining data from the base station to the mobile station via the relay station, wherein the base station and the relay station transmit the data according to the selected transmission mode, wherein the selecting comprises:
- calculating a channel capacity associated with the plurality of wireless links, based on the channel estimation value;
- calculating an estimated transmission time of the data in each of the plurality of transmission modes, based on the calculated channel capacity; and
- selecting a transmission mode with a minimum estimated transmission time from the plurality of transmission modes, and wherein the estimated transmission time $T_3$ of the third mode is calculated according to an equation, $$T_3 = B \frac{C_{sm2}}{C_{sm1} + C_{sm2}} \left( \frac{1}{C_{br}} + \frac{1}{C_{sm2}} \right)$$

where B designates a number of bits of transmitted data, $C_{br}$ designates a closed loop capacity from the base station to the relay station, $C_{sm1}$ designates an open-loop capacity from the base station to the mobile station, and $C_{sm2}$ designates an open-loop capacity from the relay station to the mobile station.

19. The method of claim 10, further comprising:

determining a code rate of each of the plurality of wireless links by the mobile station, based on the channel estimation value; and transmitting the determined code rate to each of the base station and the relay station, wherein the base station and the relay station encode the data according to the determined code rate and transmits the encoded data.

20. The method of claim 10, wherein the third mode comprises:

transmitting first partial data from the base station to the relay station in a first time slot;

forwarding the first partial data from the relay station to the mobile station in a second time slot; and directly transmitting second partial data from the base station to the mobile station in the second time slot.

21. The method of claim 20, wherein a plurality of relays stations are provided, and the transmitting of the first partial data simultaneously transmits third partial data and fourth partial data that are contained in the first partial data.

22. A method of controlling a data transmission in a wireless relay system, the method comprising:

selecting any one of a plurality of transmission modes by a base station, based on a comparative location of a relay station and a mobile station; and transmitting information about the selected transmission mode to the base station and the relay station, so that the base station and the relay station transmit data according to the selected transmission mode, wherein the plurality of transmission modes comprises at least one of:
- a first mode which directly transmits total data from the base station to the mobile station;
- a second mode which simultaneously transmits the total data from the base station to the mobile station and to the relay station; and
- a third mode which directly transmits a certain portion of the total data from the base station to the mobile station, and transmits remaining data from the base station to the mobile station via the relay station, wherein the selecting of one of the first mode, the second mode, and the third mode depends on a distance between the mobile station and the base station in the wireless relay system.

23. A wireless relay system comprising:
a base station which directly transmits first partial data of total data to a mobile station, and transmits second partial data of the total data to the mobile station via a relay station,
wherein the relay station forwards the second partial data, received from the base station, to the mobile station,
wherein the transmitting by the base station of the first partial data and the forwarding of the second partial data by the relay station are simultaneously performed after transmitting the second partial data from the base station to the relay station,
wherein executing the transmitting the first partial data, the transmitting the second partial data, and forwarding the second partial data is when a distance between the mobile station and the base station in the wireless relay system is above a predetermined threshold and executing a different mode of transmitting when the distance between the mobile station and the base station in the wireless relay system is equal to or less than the predetermined threshold.

24. The wireless relay system of claim 23, wherein the relay station decodes the second partial data, and encodes the decoded second partial data at a predetermined code rate to forward to the mobile station.

25. The wireless relay system of claim 24, wherein the code rate is determined by the mobile station, and is based on at least one channel estimation value of the plurality of wireless links that respectively connect the base station, the relay station, and the mobile station to each other.

26. A wireless relay system comprising a base station, a relay station, and a mobile station in each of a plurality of cells, wherein:
the base station directly transmits first partial data of total data to the mobile station, and transmits second partial data of the total data to the mobile station via the relay station, and
the mobile station simultaneously receives the first partial data from the base station and the second partial data from the relay station,
wherein executing the transmitting the first partial data, the transmitting the second partial data, and forwarding the second partial data is when a distance between the mobile station and the base station in the wireless relay system is above a predetermined threshold and executing a different mode of transmitting when the distance between the mobile station and the base station in the wireless relay system is equal to or less than the predetermined threshold.

27. The wireless relay system of claim 26, wherein the mobile station determines a comparative ratio of the first partial data to the second partial data based on a channel capacity of a first link between the base station and the mobile station and a channel capacity of a second link between the relay station and the mobile station.

28. The wireless relay system of claim 26, wherein the relay station decodes the second partial data, and encodes the decoded second partial data at a predetermined code rate to forward to the mobile station.

29. The wireless relay system of claim 28, wherein the code rate is determined by the mobile station, and is based on at least one channel estimation value of the plurality of wireless links that respectively connect the base station, the relay station, and the mobile station to each other.

30. A wireless relay system comprising a base station, at least one relay station, and a mobile station in each of a plurality of cells, wherein:

the mobile station measures a channel capacity of a plurality of wireless links that respectively connect the base station, the relay station, and the mobile station to each other, and selects any one of a plurality of transmission modes, based on the measured channel capacity, and the base station and the relay station transmit data to the mobile station according to the selected transmission mode, and
the plurality of transmission modes comprises at least one of:
a first mode which directly transmits total data from the base station to the mobile station;
a second mode which directly transmits the total data from the base station to the mobile station, and transmits the total data from the base station to the mobile station via the at least one relay station; and
a third mode which directly transmits a certain portion of the total data from the base station to the mobile station, and transmits remaining data from the base station to the mobile station via the at least one relay station,
wherein the selecting of one of the first mode, the second mode, and the third mode depends on a distance between the mobile station and the base station in the wireless relay system.

31. The wireless relay system of claim 30, wherein the mobile station comprises two antennas, and each of the base station and the relay station comprises a single antenna, and the plurality of transmission modes comprises the first mode, the second mode, and the third mode.

32. The wireless relay system of claim 30, wherein each of the base station and the relay station comprises four antennas, and the mobile station comprises a single antenna, and the plurality of transmission modes comprises the first mode and the second mode.

33. The wireless relay system of claim 30, wherein each of the base station and the relay station comprises four antennas, and the mobile station comprises two antennas, and the plurality of transmission modes comprises the first mode, the second mode, and the third mode.

34. The method of claim 1, wherein executing the transmitting the first partial data, the transmitting the second partial data, and forwarding the second partial data is when a distance between the mobile station and the base station is at least 500 meters and executing the different mode of transmitting when the distance between the mobile station and the base station is equal to or less than 500 meters, wherein the different mode is selected from a direct communication mode which directly transmits total data from the base station to the mobile station and an indirect communication mode which transmits the total data from the base station to the mobile station via the at least one relay station.

35. The method of claim 10, wherein the first mode is selected when the distance between the mobile station and the base station is equal to or less than 500 meters and wherein the third mode is selected when the distance between the mobile station and the base station is at least 500 meters.

36. The method of claim 35, wherein the selecting of one of the first mode, the second mode, and the third mode further depends on a configuration of a network, the configuration of the network comprising a number of antennas provided on the mobile station and the base station.

* * * * *